United States Patent [19]
Fukui et al.

[11] Patent Number: 5,847,826
[45] Date of Patent: Dec. 8, 1998

[54] SENSOR FOR DETECTING RAINDROPS, WIPER DRIVE APPARATUS USING THE DEVICE, AND VEHICLE USING THEM

[75] Inventors: Hiroshi Fukui; Yasunobu Sakai; Junichi Takagi, all of Kyoto, Japan

[73] Assignee: Omron Corporation, Kyoto, Japan

[21] Appl. No.: 912,564

[22] Filed: Aug. 18, 1997

Related U.S. Application Data

[63] Continuation of Ser. No. 429,153, Apr. 26, 1995, abandoned.

[30] Foreign Application Priority Data

| Apr. 26, 1994 | [JP] | Japan | 6-112239 |
| Feb. 28, 1995 | [JP] | Japan | 7-067015 |

[51] Int. Cl.$^6$ .............. G01V 9/04; G08B 21/00
[52] U.S. Cl. .............. 356/335; 318/DIG. 2; 340/602
[58] Field of Search .............. 356/335; 250/222.1, 250/222.2; 318/DIG. 2, 444, 483; 15/DIG. 15; 340/602

[56] References Cited

U.S. PATENT DOCUMENTS

| 3,591,290 | 7/1971 | Zinner ................... 356/335 |
| 3,823,320 | 7/1974 | Ledoux .................. 356/335 |
| 4,476,419 | 10/1984 | Fukatsu . |
| 4,595,866 | 6/1986 | Fukatsu et al. ......... 318/DIG. 2 |
| 4,634,855 | 1/1987 | Friend et al. ........... 250/222.1 |
| 4,987,296 | 1/1991 | Kajioka et al. ......... 250/222.1 |
| 5,117,168 | 5/1992 | Nomura et al. ........ 318/DIG. 2 |
| 5,426,501 | 6/1995 | Hokanson et al. ...... 356/335 |

FOREIGN PATENT DOCUMENTS

| 3823909 | 6/1989 | Germany . |
| 47 17 160 | 11/1992 | Germany . |
| 62-156859 | 10/1987 | Japan . |
| 4-35797 | 8/1992 | Japan . |
| 6-18281 | 5/1994 | Japan . |
| WO 91/01234 | 2/1991 | WIPO . |

OTHER PUBLICATIONS

"Patent Abstracts of Japan," vol. 007, No. 217, 27 Sep. 1983.
"Patent Abstracts of Japan," vol. 010, No. 316, 13 Jun. 1996.
"Patent Abstracts of Japan," vol. 017, No. 619, 8 Jun. 1993.
"Patent Abstracts of Japan," vol. 13, No. 176, 1 Nov. 1989.
"Patent Abstracts of Japan," vol. 008, No. 057, 15 Mar. 1984 (JP-A-58-209640).
"Patent Abstract of Japan," vol. 007, No. 015 21 Jan. 1983 (JP-A-57 171279).

*Primary Examiner*—Richard A. Rosenberger
*Attorney, Agent, or Firm*—Dickstein Shapiro Morin & Oshinsky LLP

[57] ABSTRACT

A raindrop sensor of the present invention including light emitting part which emits a strip-shaped light; light receiving part which receives the strip-shaped light emitted from the light emitting means; and detecting device which detects a raindrop based on the amount of the light received by the light receiving device. The raindrop sensor of the present invention is applied to a wiper apparatus of a vehicle. The wiper apparatus includes a wiper for wiping a windshield of the vehicle, and a control unit for instructing a given wiper operation to the wiper in accordance with a given output signals from the raindrop sensor, the wiper being driven in accordance with the instruction from the control unit. Also, the wiper apparatus using the raindrop sensor is applied to a vehicle.

2 Claims, 42 Drawing Sheets

| GROUP | $g_1$ | $g_2$ | $g_3$ | $g_4$ | $g_5$ |
|---|---|---|---|---|---|
| THRESHOLD VALUE | $e_1 \sim 1.0$ | $e_2 \sim e_1$ | $e_3 \sim e_2$ | $e_4 \sim e_3$ | $e_5 \sim e_4$ |

| GROUP | $g'_1$ | $g'_2$ | $g'_3$ | $g'_4$ | $g'_5$ |
|---|---|---|---|---|---|
| THRESHOLD VALUE | $0 \sim v_1$ | $v_1 \sim v_2$ | $v_2 \sim v_3$ | $v_3 \sim v_4$ | $v_4 \sim v_5$ |

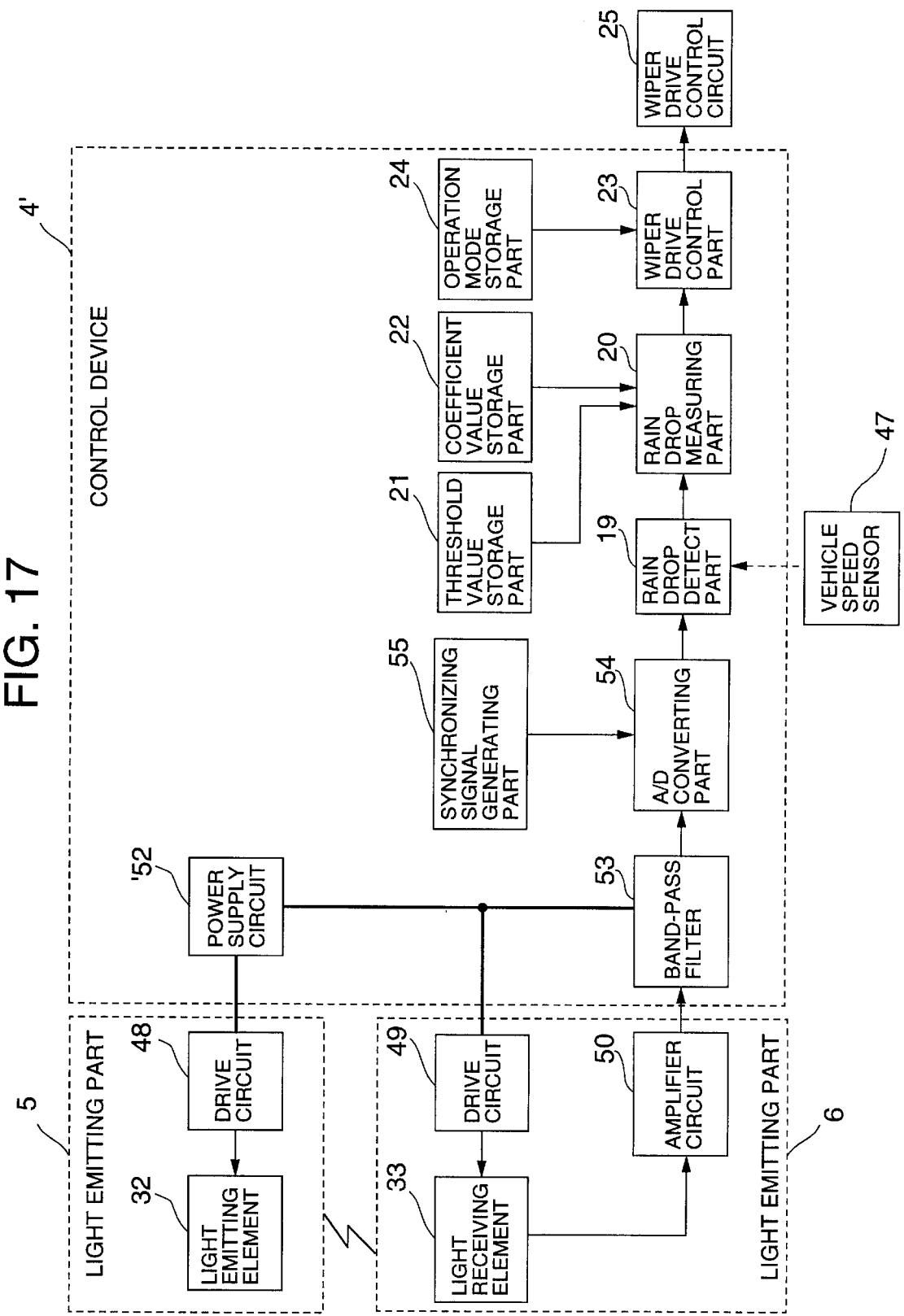

FIG. 32A
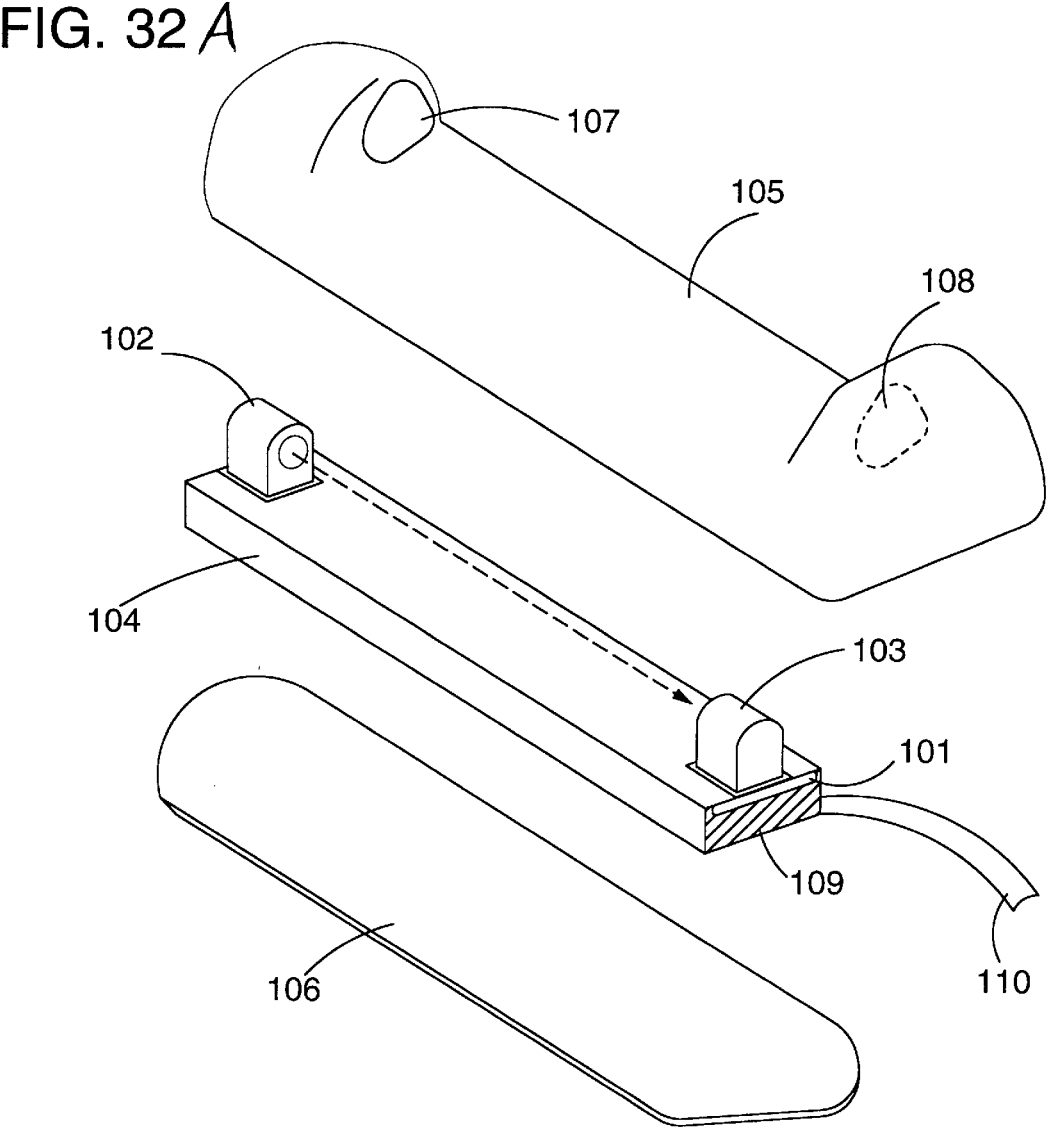
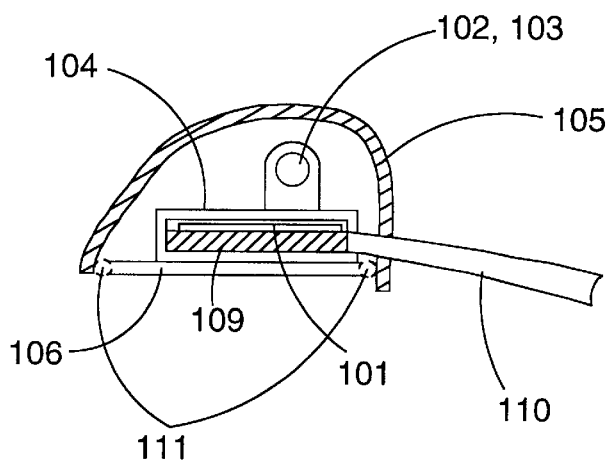
FIG. 32B

SENSOR FOR DETECTING RAINDROPS, WIPER DRIVE APPARATUS USING THE DEVICE, AND VEHICLE USING THEM

This application is a continuation of application Ser. No. 08/429,153, filed Apr. 26, 1995, now abandoned.

BACKGROUND OF THE INVENTION

1. Field of the Invention

The present invention relates to a raindrop detect sensor for detecting a raindrop, a raindrop measuring device for measuring the amount of raindrops using the raindrop detect sensor, a wiper drive apparatus for driving a wiper according to the amount of raindrops, and a vehicle using these devices.

2. Description of the Related Art

Conventionally, in a vehicle such as a car and the like, there exist such devices as shown in FIGS. 28 and 29 respectively, as a raindrop detect sensor which detects the amount of raindrops in order to drive a wiper automatically.

FIG. 28 shows a conventional raindrop detect sensor of a total reflection type.

In FIG. 28, a light emitting element 71 and a light receiving element 72 are respectively provided in the inside of a windshield 70. On the inner surface of the windshield 70, prisms 73, 74 are respectively disposed to oppose to the light emitting and receiving elements 71, 72.

When light is radiated from the light emitting element 71 onto the windshield 70 through the prism 73, and if a raindrop 75 does not attach to the windshield 70, the light is totally reflected and thus the whole light can advance within the windshield 70, passes through the prism 74, and finally enters the light receiving element 72.

On the other hand, when the raindrop 75 attaches to the windshield 70, the light is caused to leak outwardly due to the raindrop 75. Therefore, the amount of the light received by the light receiving element 72 is reduced. If the amount of the light received by the light receiving element 72 is measured by use of this principle, then the raindrop 75 can be detected.

Now, FIG. 29 shows a raindrop detect sensor of an electrostatic capacity type.

This raindrop detect sensor detects the raindrop 75 by means of a variation in an electrostatic capacitance between a pair of transparent electrodes 76a and 76b. The transparent electrodes 76a and 76b are mounted on the surface of a vehicle such as a windshield or the like.

Then, FIG. 30 shows a raindrop detect sensor of a piezoelectric vibration type.

This raindrop detect sensor has a piezoelectric vibrating element 77 which is mounted on the surface of a vehicle body. The vibration caused by the falling of the raindrop 75 is converted by means of the piezoelectric vibrating element 77 to detect the raindrop.

Among the above-mentioned conventional three types of raindrop detect sensors, the raindrop detect sensor of a total reflection type shown in FIG. 28 must be mounted to be opposed to the wiping surface of the wiper. Therefore, the sensor interferes with the visual field of a driver. Also, if the distance between the light emitting and receiving elements 71 and 72 is increased in order to widen the detect area of the raindrop, then the detect accuracy of the sensor is lowered.

In the raindrop detect sensor of an electrostatic capacity type shown in FIG. 29, if the space between two electrodes 76a and 76b is filled with the raindrops 75, the electrostatic capacity thereof reaches its saturation. For this reason, it is necessary to provide a mechanism for removing the raindrops 75.

Further, in the raindrop detect sensor of a piezoelectric vibration type shown in FIG. 30, when the raindrops are small raindrops such as a dizzle or the like, no vibration can be obtained and, therefore, no raindrops can be detected. On the other hand, an air vibration such as a sound or the like can be detected in error.

In order to solve the above-mentioned problems, there is known a raindrop detect sensor of a type in that light emitting and receiving elements are disposed in proper positions of a vehicle in a mutually opposing manner and the raindrop can be detected by means of a variation in the quantity of light received by the light receiving element (Unexamined Japanese Utility Model Publication No. Sho. 61-123963).

Now, FIG. 31 shows the appearance of the a raindrop detect sensor which solves the problems the above-mentioned raindrop detect sensor. In the sensor, projections 83 and 84 are provided in the two end portions of a case body 82 and light emitting and receiving elements 80 and 81 are respectively stored in the projections 83 and 84.

In the above structure, when the raindrop passes between the light emitting and receiving elements 80 and 81, the light emitted from the light emitting element 80 is blocked off by the raindrop. Accordingly, since the amount of light received by the light receiving element 81 is reduced, the passage of the light can be detected.

In the above structure, however, not only the light radiated from the light emitting element 80 is diffused forwardly as well as upwardly and downwardly, but also the reflected light and disturbed light of the diffused light enter the light receiving element 81. Therefore, the present structure is susceptible to noise and is thus not able to provide a detect result with a high accuracy.

In addition, for example, Unexamined Japanese Utility Model Publication No. Sho. 62-156859 discloses a raindrop detecting sensor for optically detecting a raindrop in which an optical system and detecting circuit portion are stored in one housing. The sensor is mounted on a place where a rain falls so that a vehicle has a function for detecting a raindrop.

In the conventional sensor, the optical system and the detecting circuit portion is stored in one housing. Consequently, the sensor itself is caused to be large, and further if such a large sensor is mounted on the vehicle, a projecting portion from the body of the vehicle is caused to be large. In addition, when the sensor is mounted on the vehicle, the optical system must be positioned at a place where a reflective light from the body of the vehicle is not received, that is, it takes an appropriate distance from the body of the vehicle. Accordingly, such a large sensor increase the air resistance of the vehicle, and offends the eye. The design of the vehicle is very important for a buyer of the vehicle. Accordingly, the change of the vehicle's design due to mounting the sensor is serious problem for a buyer or user of the vehicle.

Moreover, FIGS. 32A and 32B shows a further conventional raindrop detect sensor. The body of the sensor is a light emitting portion 102 and a light receiving portion 103 which are fixed on a PWB 101. The body is fixed to a metal plate 104 being formed to be a hollow rectangular pillar which is filled with a resin 109. Further, whole of the sensor body thus constructed is inserted into a waterproof cover 105 and covered by a bottom plate 106. Then, a resin 111 is applied to the gap between the waterproof cover 105 and the bottom plate 106 so as to accomplish the waterproof of the sensor. In addition, a beam passing widow 107 is provided at one end side of the waterproof cover 105 so as to pass the light emitted from the light emitting portion 102. A beam passing window 108 is provided at the other end side thereof so as to pass the light to be entered to the light receiving portion 103. A cable 110 effects to connect the sensor with various circuits in the vehicle (not shown).

Such a structure intends to have the waterproof function and to prevent the shift of the optical axis due to the temperature change or vibration. The filled portion with the resin 111 for fixing the cable 110 is so short that water may enter into the sensor. In addition, since whole of the sensor is inserted into the waterproof cover, the sensor has a problem that the size of the sensor caused to be large.

SUMMARY OF THE INVENTION

It is an object of the present invention to provide a miniaturized raindrop detect apparatus which detects the raindrop by means of a variation in the amount of light received when the raindrop crosses the strip-shaped light so as to detect a raindrop simply and accurately, and wiper device using the raindrop detect apparatus applied for a vehicle.

In order to accomplish the above object, a raindrop sensor of the present invention includes light emitting part which emits a strip-shaped light; a light receiving part which receives the strip-shaped light emitted from the light emitting means; and a detecting device which detects a raindrop based on the amount of the light received by the light receiving device.

In order to accomplish the above object, another raindrop sensor of the present invention includes a light emitting part for emitting a light, a light receiving part for receiving the light emitted from the light emitting part, and a processing unit for processing the emitting light and a light received by the light receiving part, the light emitting part and the light receiving part being exposed to an outside of the vehicle, the processing unit being provided in an inside of the vehicle.

The raindrop sensor of the present invention is applied to a wiper apparatus of a vehicle. The wiper apparatus includes a wiper for wiping a windshield of the vehicle, and a control unit for instructing a given wiper operation to the wiper in accordance with a given output signal from the raindrop sensor, the wiper being driven in accordance with the instruction from the control unit. Also, the wiper apparatus using the raindrop sensor is applied to a vehicle.

Accordingly, in the raindrop sensor of the present invention, when the raindrop passes through the strip-shaped light radiated from the light emitting means, then the strip-shaped light is blocked off by the raindrop to thereby reduce the quantity of the light to be received by the light receiving means. The detecting device detects the raindrop passing through the strip-shaped light by means of a variation in the quantity of the light received.

Furthermore, the raindrop sensor of the present invention can be miniaturized. Therefore, it is preferable to be installed in a wiper driving device of a vehicle, and even if the raindrop sensor is installed to the vehicle, it does not exert bad influence to the appearance of the vehicle.

BRIEF DESCRIPTION OF THE DRAWINGS

In the accompanying drawings;

FIG. 17 is a block diagram showing an electric structure of the wiper drive apparatus shown in FIG. 4;

FIGS. 32A and 32B show a further conventional raindrop sensor;

PREFERRED EMBODIMENT OF THE INVENTION

The preferred embodiment of the present invention will be described referring to the accompanying drawings as follows.

Figure 1:
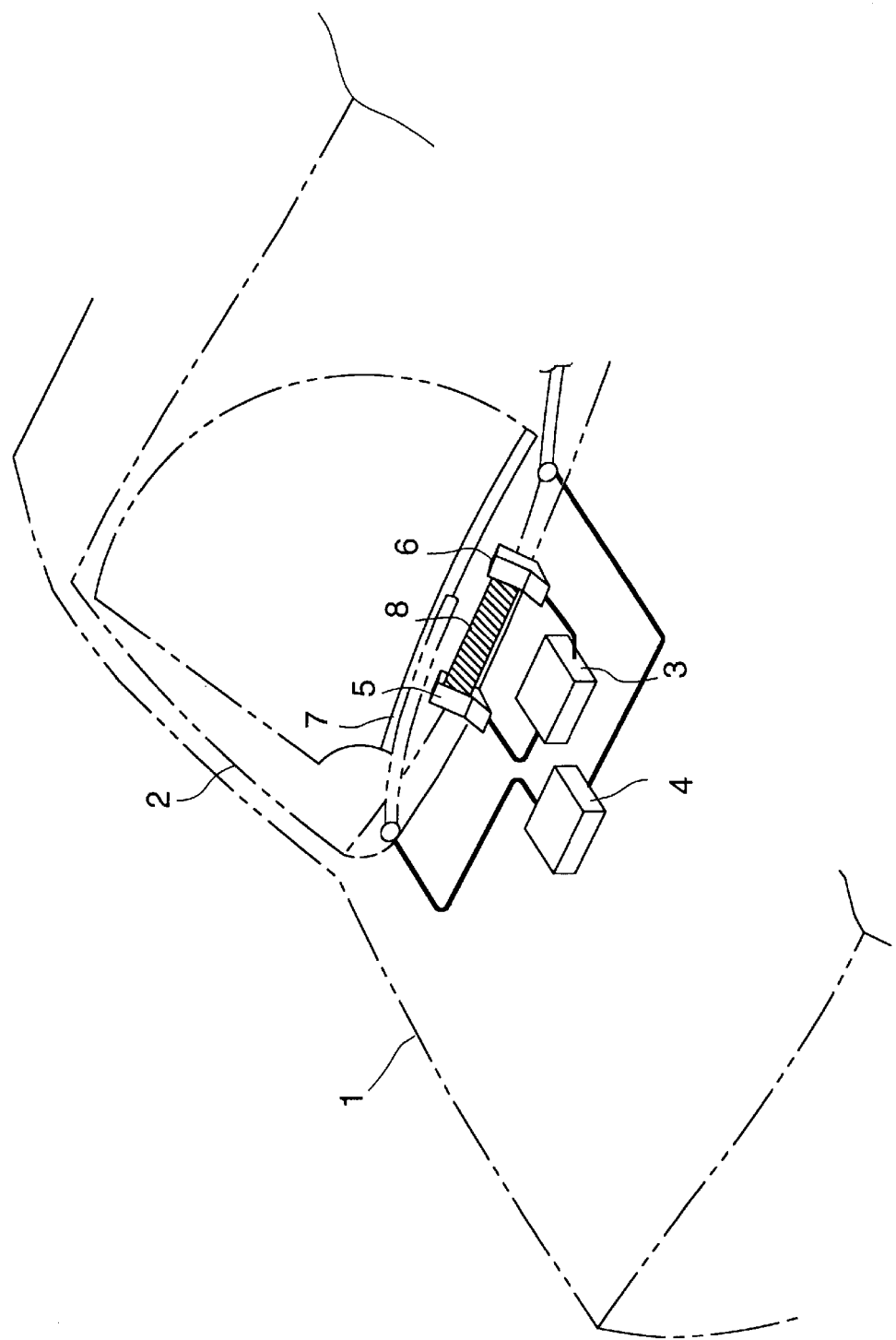
FIG. 1 shows a wiper drive apparatus according to the invention which is mounted on a vehicle.

Now, FIG. 1 shows a case in which a wiper drive apparatus according to the invention is mounted in a vehicle.

In the boundary portions between a bonnet 1 and a windshield 2, a pair of light emitting and receiving parts 5 and 6 are so disposed as to oppose each other at a given distance from each other.

An amplifier unit 3 and a control device 4 are stored in the interior of the vehicle, and the light emitting and receiving parts 5 and 6 are both connected to the amplifier unit 3. The amplifier unit 3 is used to apply a synchronizing signal (to be described later) to the light emitting part 5 so that the light emitting part 5 can emit a strip-shaped light (which is shown by reference character 8 in FIG. 1) intermittently. The amplifier unit 3 performs an amplifying process and a digitizing process on the amount of the light received by the light receiving part 6 and, thereafter, outputs the amount of the processed light to the control device 4.

The control device 4 is used to detect a raindrop from the amount of the light received from the amplifier unit 3 to drive a wiper 7 of a vehicle under a given condition. That is, the control device 4 checks a variation in the rate of the received light from the data on the digitized amount of the received light and, if the received light rate is found to have varied, detects or judges that the raindrop has passed between the light emitting part 5 and light receiving part 6. Further, the control device 4 finds the amount of raindrops from the thus detected result and, if the amount of raindrops reaches a previously set threshold value, the control device 4 outputs a drive signal to a wiper drive circuit (not shown). In FIG. 1, a one-dot chained line points out the wiping surface of the wiper 7.

Figure 2:
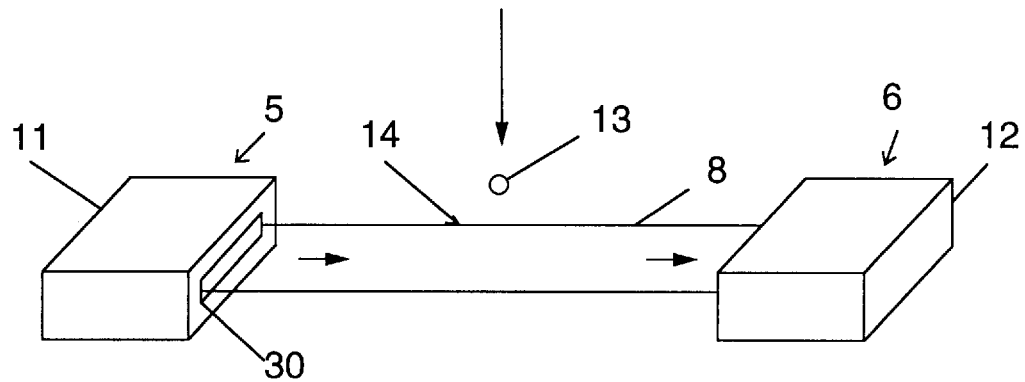
FIG. 2 shows a structure of light emitting and receiving parts according to the present invention.

The light emitting and receiving parts 5 and 6, as shown in FIG. 2, are disposed such that they are opposed to and spaced a part a given distance from each other.

Figure 3:
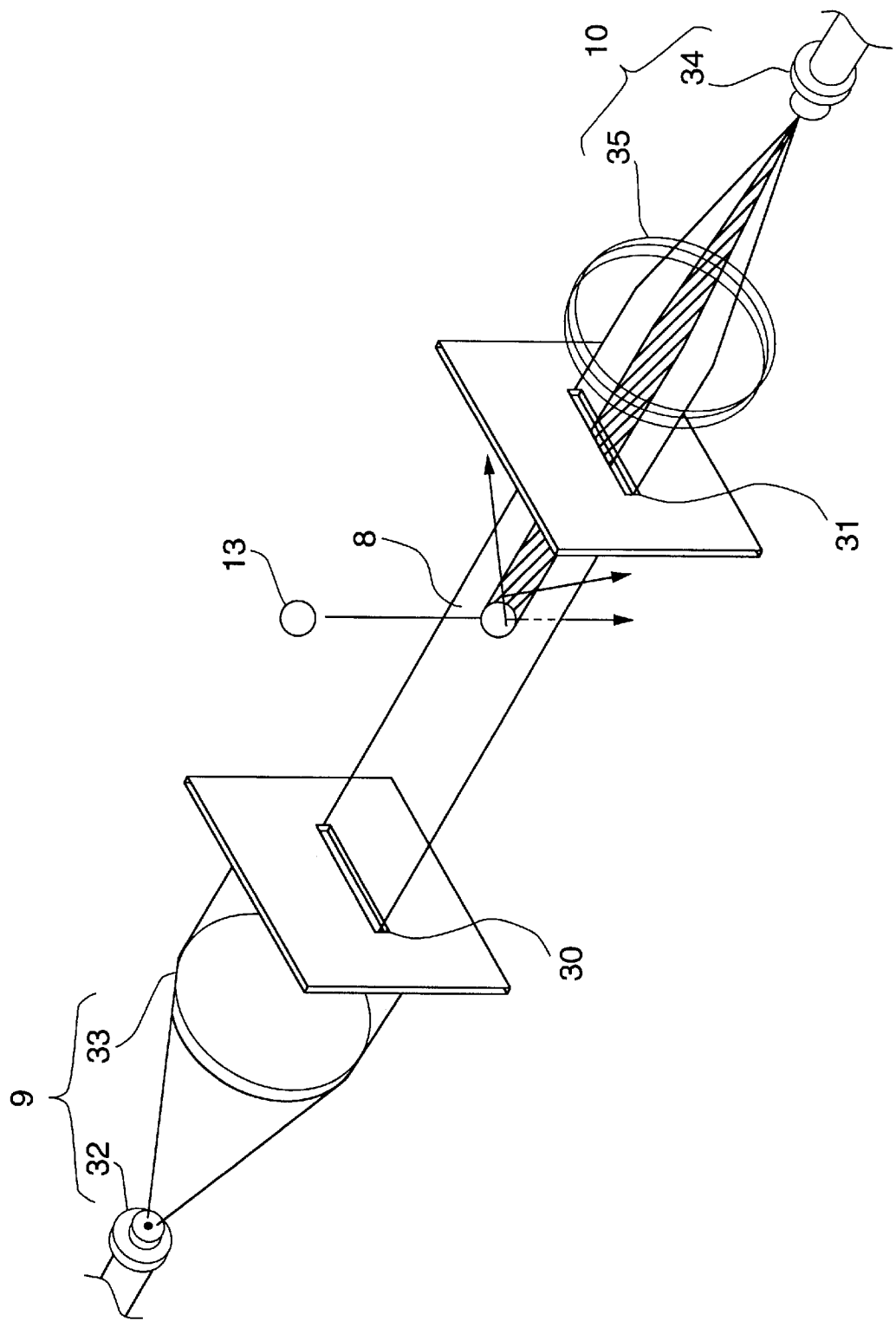
FIG. 3 shows an internal structures of the light emitting and receiving parts.

The light emitting and receiving parts 5 and 6 are respectively formed by arranging a light emitting device 9 and a light receiving device 10 (both of which are shown in FIG. 3) in the respective interiors of case bodies 11 and 12, while the two case bodies 11 and 12 include in their opposing surfaces slits 30 and 31 (both of which are shown in FIG. 3) which are respectively used to emit and receive a strip-shaped light 8.

FIG. 3 shows a relationship between the interior structures of the light emitting and receiving parts 5 and 6 and the strip-shaped light 8.

In the interior of the case body 11, there is stored the light emitting device 9 which includes a light emitting element 32 such as an LED or the like and a collimating lens 33 for generating a parallel light from the light emitted from the light emitting element 32. The parallel light from the collimating lens 33 is passed through the slit 30 to project the strip-shaped light 8.

The slit 31 on the light receiving part 6 side is so positioned as to correspond to the passage of the strip-shaped light 8. In the interior of the case body 12, there is disposed a light receiving device 10 which includes a condensing lens 35 for condensing the passed strip-shaped light 8 and a light receiving element 34 for receiving the light from the condensing lens 35.

Also, the two case bodies 11 and 12 are respectively formed of a highly water absorbing material (such as a sponge or the like) in order to prevent the raindrops from attaching to the light emitting and receiving surfaces thereof. The light emitting and receiving devices 9 and 10 are respectively disposed at positions spaced apart a sufficient distance from the respective slits 30 and 31.

In the light emitting and receiving parts 5 and 6, the respective longitudinal directions of the two slits 30 and 31 are formed at an angle of 45° with respect to the horizontal surface so that, while the vehicle is running at a normal speed, a raindrop 13 can enter at an angle substantially perpendicular to the strip-shaped light 8. Consequently, the passage area 14 of the strip-shaped light 8 can function as the detect area of the raindrop.

Here, the mounting positions of the light emitting and receiving parts 5 and 6 are not limited to the positions shown in FIG. 1, but they can be arranged in any positions of the vehicle body where the raindrop is allowed to pass between them.

Figure 4:
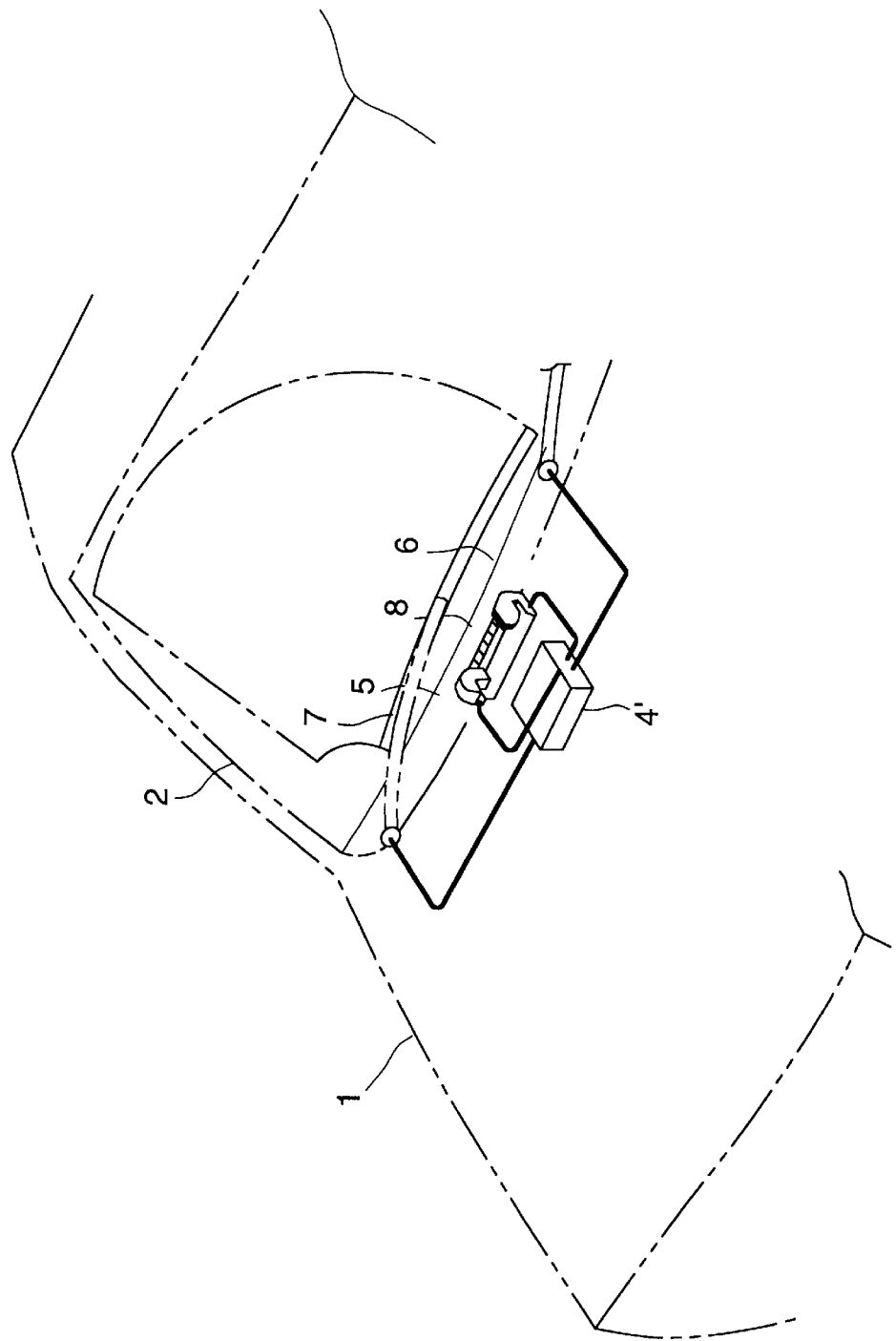
FIG. 4 shows another embodiment of the wiper drive apparatus according to the invention which is mounted on a vehicle.

Now, FIG. 4 shows another embodiment of a wiper drive apparatus according to the invention.

According to this embodiment, the light emitting and receiving parts 5 and 6 are formed integrally with each other into a united body. They are fixedly interposed between a bonnet 1 and a windshield 2, and a control device 4' is provided in the interior of the vehicle body.

The control device 4' includes a power supply which supplies direct currents to the light emitting and receiving parts 5 and 6. Also, the control device 4' checks a variation in the amount of the light received by the light receiving part 6 to thereby detect the raindrops that have passed through the strip-shaped light 8 and, and thereafter, the control device 4' calculates the amount of the raindrops from the thus detected results. Further, the control device 4' outputs a drive signal to the wiper drive circuit if the amount of the raindrops reaches a predetermined threshold value.

Figure 5:
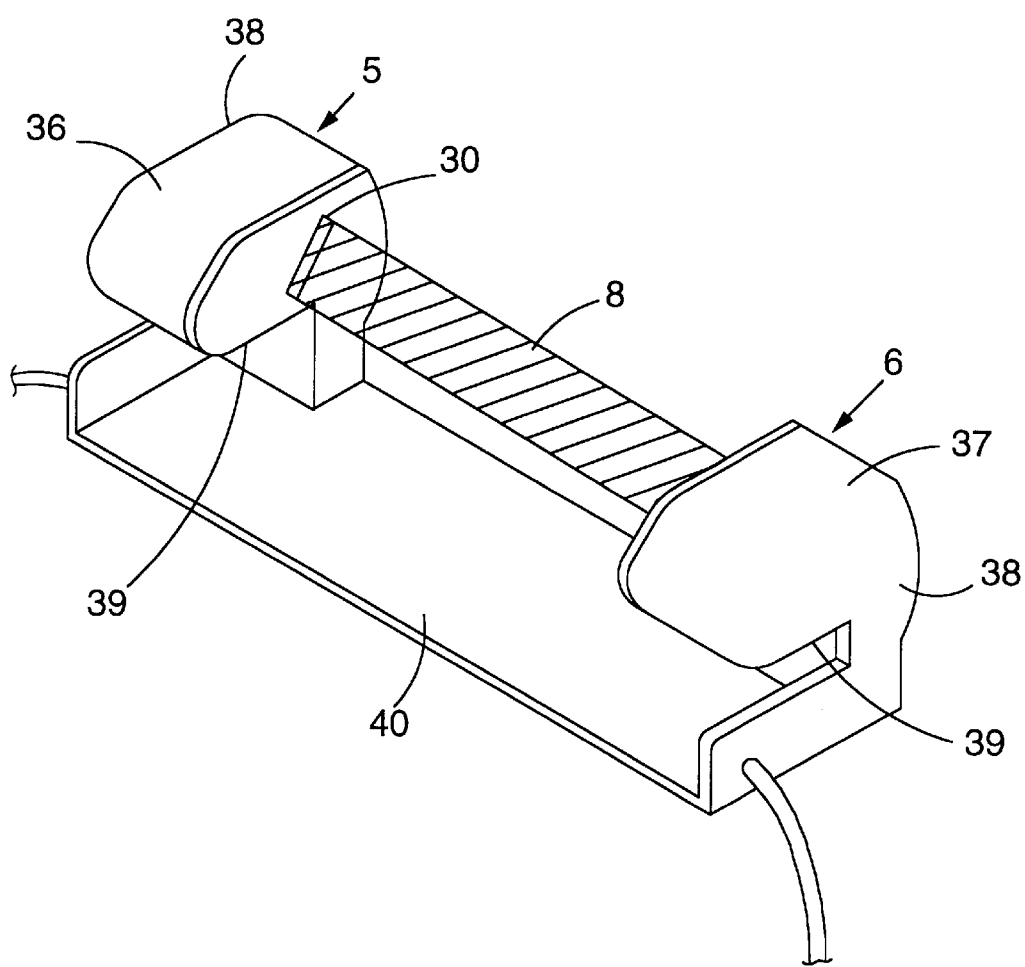
FIG. 5 is a perspective view showing an appearance of light emitting and receiving parts employed in the wiper drive apparatus shown in FIG. 4.

Now, FIG. 5 shows the specific example of the light emitting and receiving parts 5 and 6. In this case, the light emitting and receiving parts 5 and 6 respectively include case bodies 36 and 37 in which light emitting device 9 and light receiving device 10 similar to those shown in FIG. 3 are respectively stored, and a support plate 40 connects the light emitting and receiving parts 5 and 6.

The two case bodies 36 and 37 respectively include side plates 38 and 38 projecting downwardly, and the side plates 38 and 38 are connected continuously and integrally with the two side portions of the support member 40.

Also, cutaway portions 39 and 39 are formed at the two side plates 38 and 38. The side plates are engaged with the end edge portion of the bonnet 1 and the support plate 40 is inserted into a gap between the bonnet 1 and the windshield 2. Accordingly, the case bodies 36 and 37 are mounted on the bonnet 1 under the condition that they are positioned near the front surface of the windshield 2.

On the inner surface of one case body 36 forming the light emitting part 5, a rectangular slit 30 is formed to project the strip-shaped light 8. On the other hand, on the inner surface of the other case body 37 forming the light receiving part 6, a slit (not shown) having the same rectangular shape as the slit 30 is formed for receiving the strip-shaped light 8. The two slits are mutually opposed to each other. The two slits are respectively arranged in such a manner that the respective longitudinal directions thereof form an angle of 45° with respect to the horizontal surface when the two case bodies 36 and 37 are mounted onto the bonnet 1.

Here, in the interiors of the respective case bodies 36 and 37, in addition to the above-mentioned light emitting and receiving devices 9 and 10, there are disposed drive circuits for driving the light emitting and receiving devices 9 and 10, and other components.

In the above-mentioned embodiments, the light emitting and receiving devices 9 and 10 are disposed opposed to each other and the strip-shaped light 8 is projected from the light emitting device 9 to the light receiving device 10. However, this is not limitative but, according to the invention, alternatively, a reflector such as a mirror can also be used to guide the strip-shaped light 8 to the light receiving device.

Figure 6:
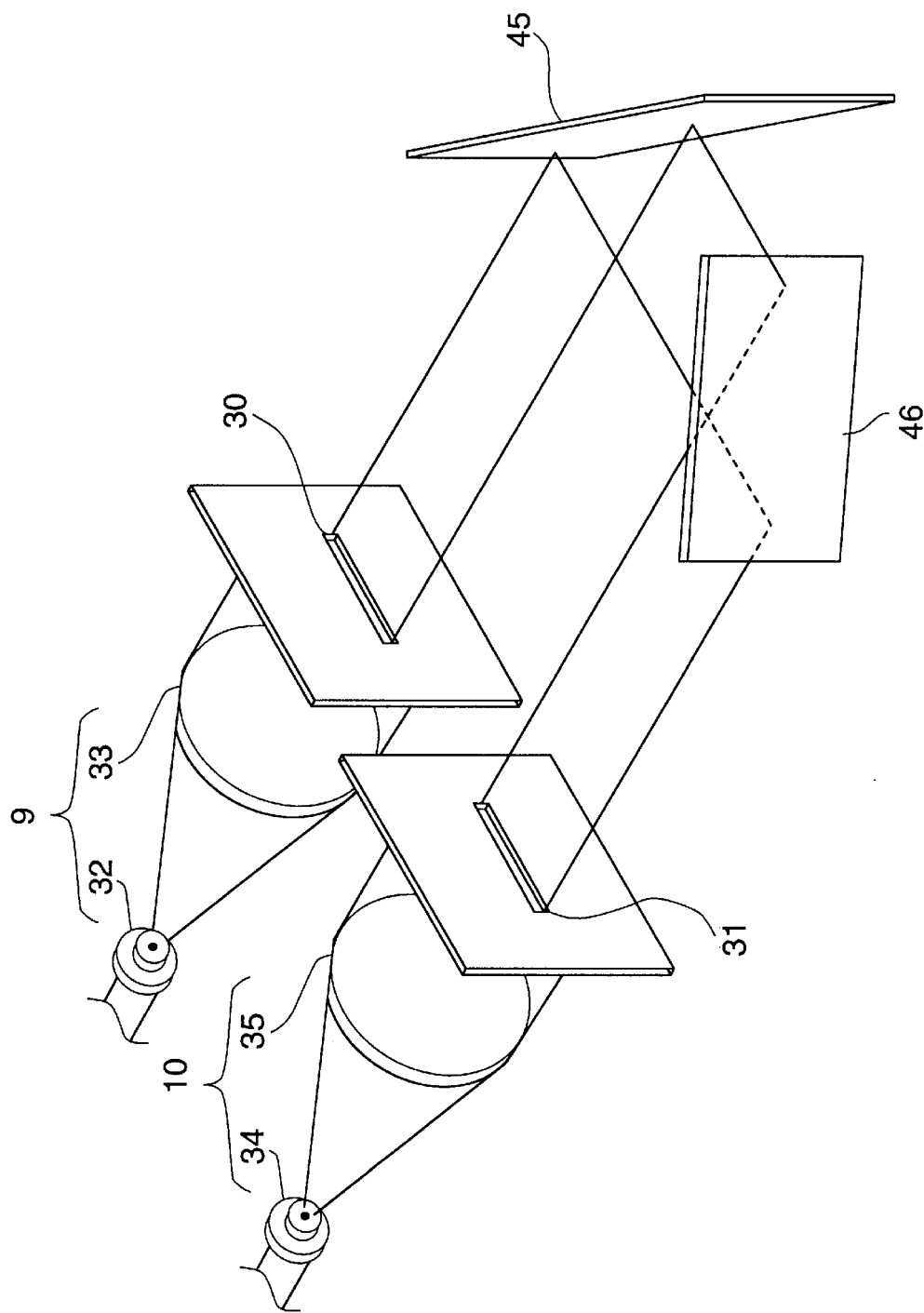
FIG. 6 shows another structure of the light emitting and receiving parts.

In FIG. 6, the light emitting and receiving devices 9 and 10 are disposed in parallel to each other in the horizontal direction, and two mirrors 45 and 46 are provided on the passage of the strip-shaped light 8 in order to guide the strip-shaped light 8 to the light receiving device 10.

Figure 7:
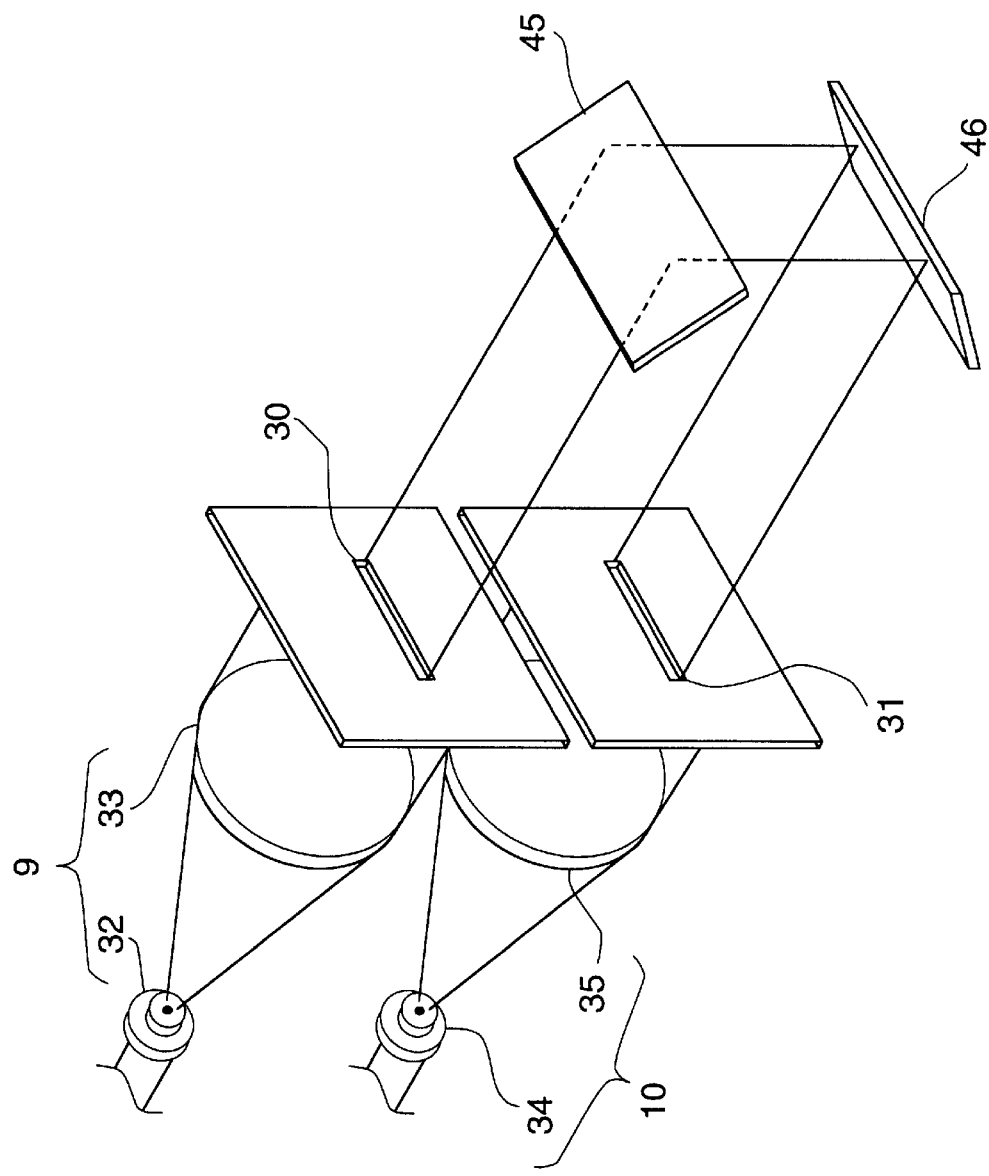
FIG. 7 shoes a further structure of the light emitting and receiving parts.

Also, in FIG. 7, the light emitting and receiving devices 9 and 10 are disposed in parallel to each other in the vertical direction and, in this case as well, the strip-shaped light 8 from the light emitting device 9 can be guided to the light receiving device 10 by use of the two mirrors 45 and 46.

Figure 8:
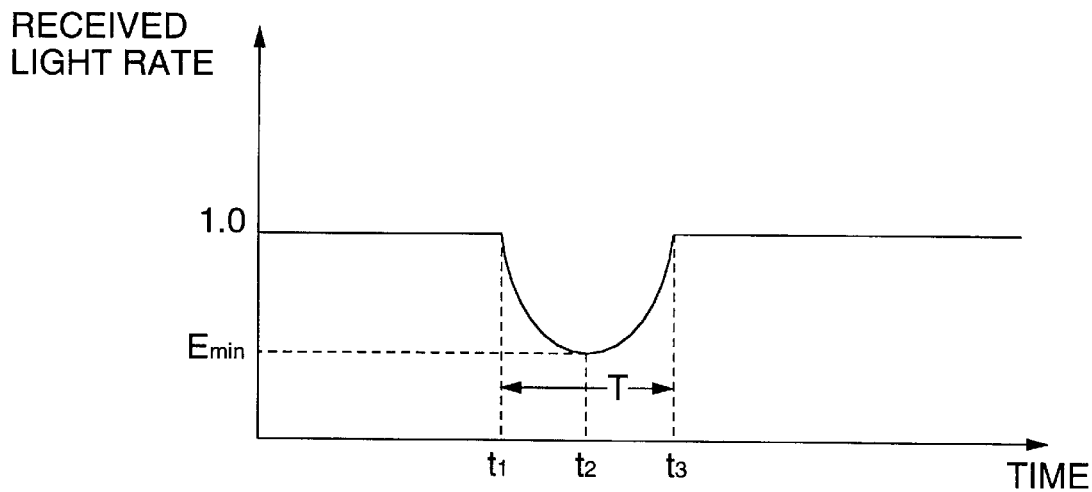
FIG. 8 shows principles of raindrop detection according to the invention.

In FIGS. 7 and 8, the structures of the light emitting and receiving devices 9 and 10 are similar to those shown in FIG. 3.

The structures shown in FIGS. 6 and 7 can apply to the wiper drive apparatus shown in FIGS. 1 and 4.

Also, in the light emitting and receiving parts shown in FIGS. 6 and 7 as well, if they are formed integrally with their respective mirrors 45 and 46, then they can be mounted onto the vehicle body easily.

FIG. 8 shows the principle of the detection of raindrops according to the invention. In particular, in FIG. 8, there are shown variations in the received light rate with the passage of time, and the received light rate obtained when no raindrop exists within the above-mentioned detect area 14 is set for 1.

If a raindrop reaches the detect area 14 at a time $t_1$, then the strip-shaped light is in part blocked off by the raindrop to thereby reduce the received light rate. As the raindrop falls down, the received light rate is gradually reduced and, at a time $t_2$ when the whole raindrop enters the detect area, the received light rate takes the minimum value of $E_{min}$. After then, as the raindrop leaves the detect area 14, the received light rate is increased and, at a time $t_3$ when the raindrop leaves the detect area 14 completely, the received light rate returns to 1.

Here, it is assumed that, while the vehicle is not in motion, a raindrop falls down perpendicularly to the detect area 14, the above-mentioned minimum value $E_{min}$ of the received light rate and the time T (a time extending from the time $t_1$–the time $t_3$ in FIG. 8) during which the received light rate varies are both increased in proportion to the diameters of the raindrops.

Figure 9:
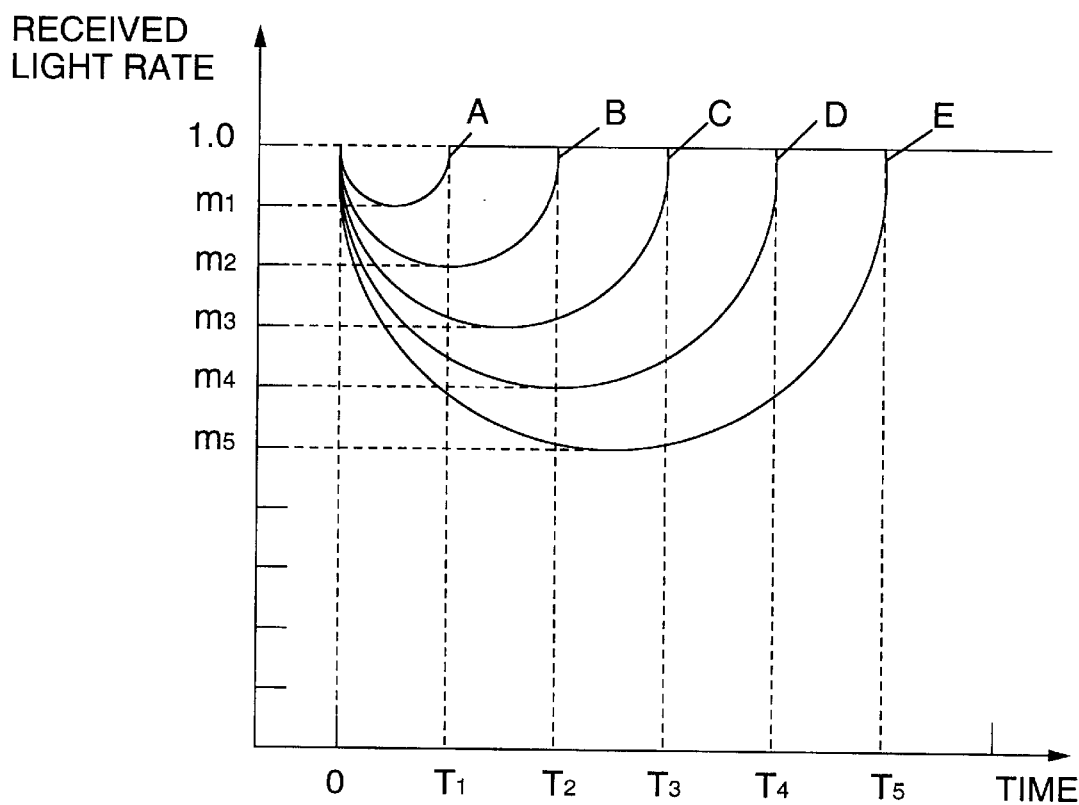
FIG. 9 shows a relation between the variation in the received light rate and the size of the raindrops.

Now, FIG. 9 shows a relation between the variations in the received light rates and the sizes of the raindrops. In FIG. 9, curves A, B, C, D, and E respectively designate the variations in the received light rate obtained when raindrops respectively having diameters of 1 mm, 2 mm, 3 mm, 4 mm, and 5 mm pass through the detect area. And, the minimum values $m_1$, $m_2$, $m_3$, $m_4$, and $m_5$ of the respective received light rates as well as the varying times $T_1$, $T_2$, $T_3$, $T_4$, and $T_5$ increase as the diameters of the raindrops increase.

While the vehicle is in motion, the relation between the variations in the received light rates and the sizes of the raindrops is similar to the previously described vehicle stopping case, however, in the proportional relationship between the varying times of the received light rates and the sizes of the raindrops, there is produced an error caused by the running speeds of the vehicle.

Figure 10:
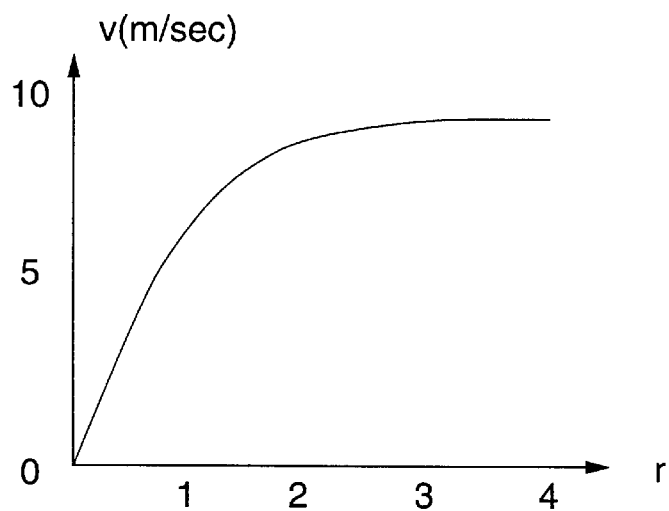
FIG. 10 shows a relation between the sizes of the raindrops and the falling speeds thereof.

On the other hand, it has been confirmed that, between the falling speeds and sizes of the raindrops in the neighborhood of the surface of the earth, such a relation is established as shown in FIG. 10.

Figure 11A:
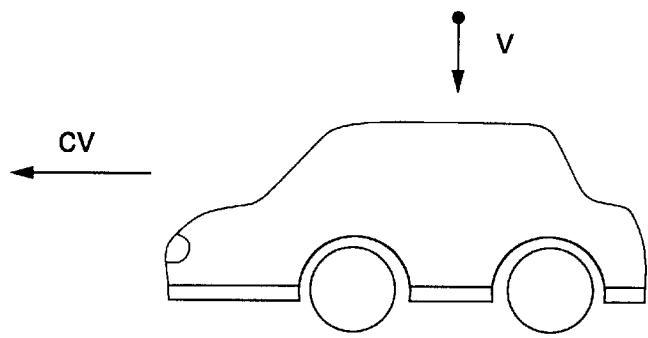
FIGS. 11A and 11B shows a method for finding the falling speed of a raindrop.
Figure 11B:
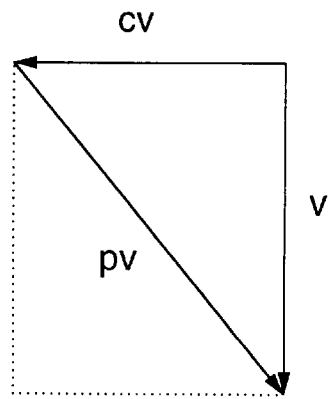

Now, in FIGS. 11A and 11B, there is shown a method for finding the falling speeds of the raindrops.

In FIG. 11, reference character cv designates the running speed of the vehicle, while v stands for the falling speed of the raindrop 13. Also, pv expresses the speed of the raindrop 13 when the raindrop 13 passes through the strip-shaped light 8, and the speed pv can be calculated from the above-mentioned varying times of the received light rates and the thickness of the strip-shaped light 8.

As can be seen clearly from the drawings, the falling speed v of the raindrop can be found according to the following expression (1).

$$v = \sqrt{(pv^2 - c^v)} \qquad (1)$$

Also, the running speed cv of the vehicle can be measured easily by use of a vehicle speed sensor mounted in the vehicle.

In the wiper drive apparatus according to the invention, the size of the detect area is set in such a manner that the raindrops are sure to enter one by one. Also, by applying the principle shown in FIGS. 9 and 10, the amount of variations in the received light rate is detected or the varying time of the received light rate is detected, and thereafter, the falling speed of the raindrop is calculated from the varying time and the signal speed of the vehicle, thereby detecting the presence or absence of the raindrop within the detect area and the size of the raindrop if it is present.

Figure 12:
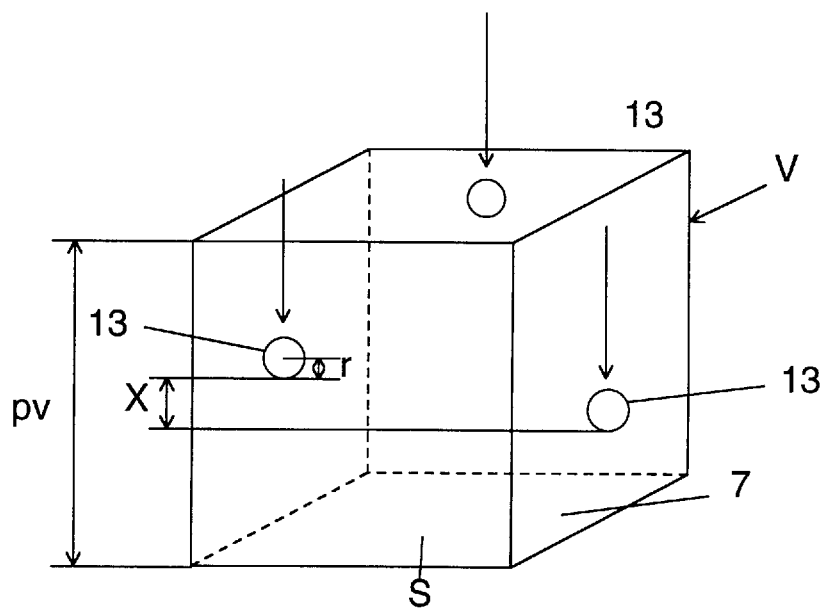
FIG. 12 shows a relation between a detect area and the amount of rain.

FIG. 12 shows a relation between the detect area and the amount of rain.

In FIG. 12, S designates the area (mm$^2$) of the detect area, and V stands for the amount of rain (mm/sec.). Also, pv expresses the speed (mm/sec.) of a raindrop passing through the detect area, and r points out the radius of the raindrop, respectively.

Here, the amount of rain V is fixed data which has been previously set in accordance with the data obtained in the past.

Here, if it is assumed that the detect area is a surface, then the number n of raindrops passing through the detect area during 1 second can be expressed by the following numeric expression (2).

$$n=SV/(4/3\pi r^3)=3SV/4\pi r^3 \qquad (2)$$

Also, if the average distance between the raindrops 13 and 13 falling through the detect area is expressed as x, then x can be found by the following expression (3).

$$x=pv/n \qquad (3)$$

In order that the raindrops can enter the detect area one by one, the conditions of the following numeric expression (4) must be satisfied.

$$x>2r \qquad (4)$$

If the numeric expression (4) is rewritten by use of the numeric expressions (2) and (3), then the following numeric expression (5) can be obtained.

$$S<(2\pi r^2 pv)/3V \qquad (5)$$

As the greatest instantaneous amount of rain in the past, 49 mm during ten minutes is recorded. Also, the minimum radius of the raindrop falling down to the earth is of the order of 0.25 mm, and the average falling speed of this raindrop is 2 m/sec. If these numeric values are substituted into the above numeric expression (5), then there is obtained S<3206 (mm$^2$). Accordingly, for example, if the transverse width of the open portion of the light emitting part 5 is set for 20 mm and the distance between the light emitting and receiving parts 5 and 6 is set for 125 mm, then the area S of the detect area 14 is 2500 mm$^2$, so that the detect area to satisfy the conditions of the numeric expression (5) can be set.

Figure 13:
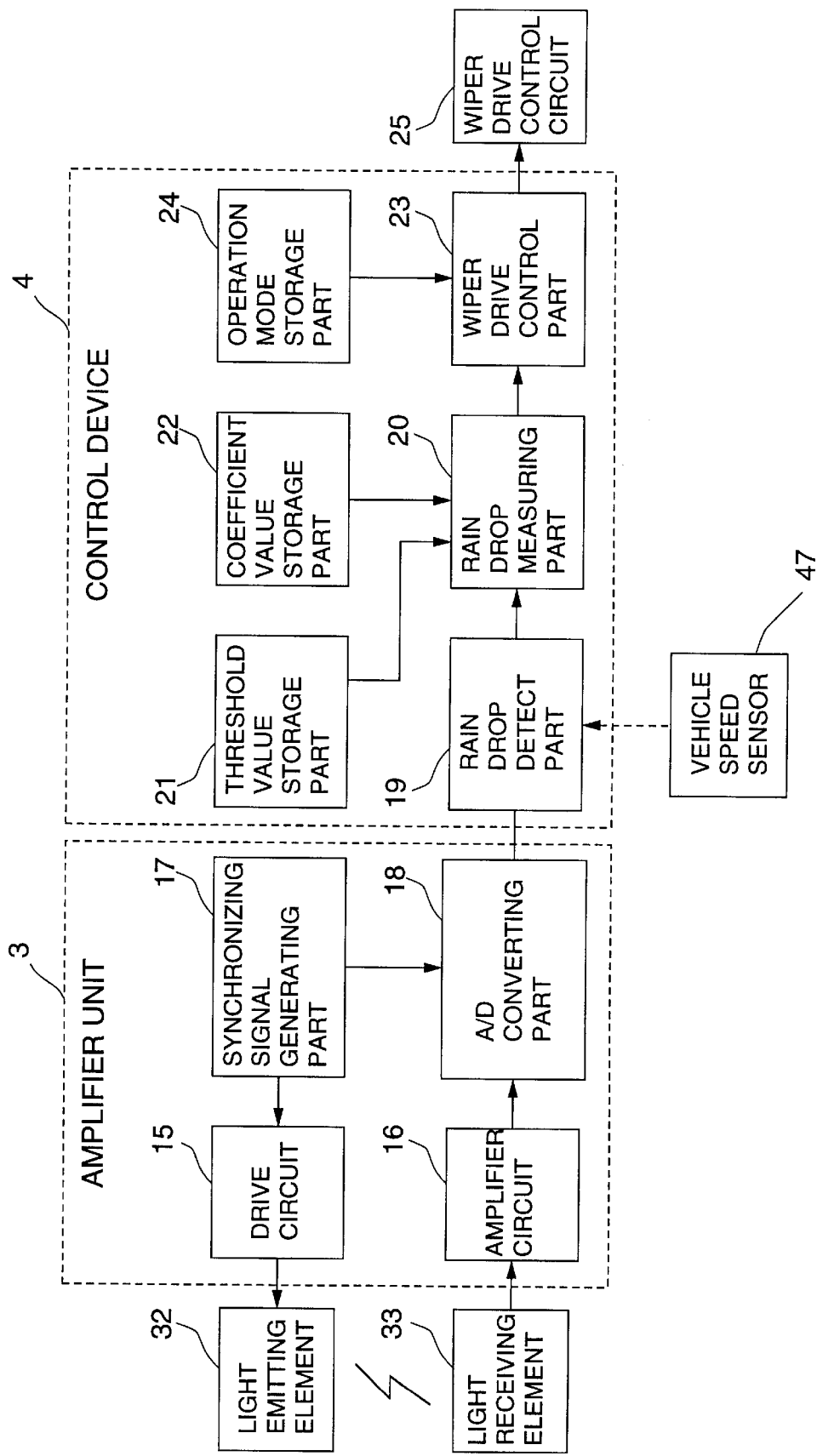
FIG. 13 is a block diagram showing an electric structure of the wiper drive apparatus shown in FIG. 1.

Now, FIG. 13 shows an electric structure of a wiper drive apparatus according to the invention.

As shown in FIG. 13, the above-mentioned amplifier unit 3 includes a drive circuit 15, an amplifier circuit 16, a synchronizing signal generating part 17, an A/D converting part 18, and the like. The amplifier unit 3 allows the light emitting element 32 to emit the light intermittently by applying a synchronizing signal output from the synchronizing signal generating part 17 to the drive circuit 15.

The amount of the light that has arrived at the light receiving element 33 is converted into an electric signal and is then amplified by the amplifier circuit 16, and is further digitized by the A/D converting part 18.

The synchronizing signal of the synchronizing signal generating part 17 is also applied to the A/D converting part 18. Accordingly, the A/D converting part 18 converts the amount of the received light into a pulse signal corresponding to the light emitting timing of the light emitting element 32 and then outputs the pulse signal.

Figure 14A:
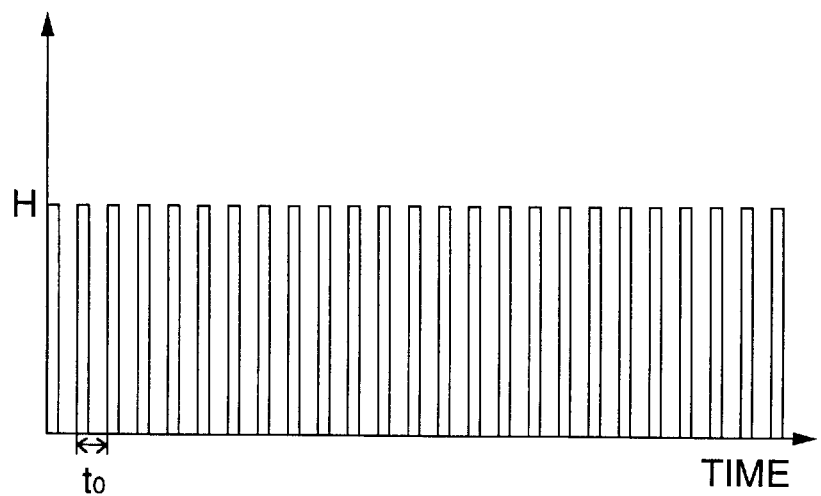
FIGS. 14A and 14B show a synchronizing signal and a received light pulse signal respectively used to drive the light emitting part.
Figure 14B:
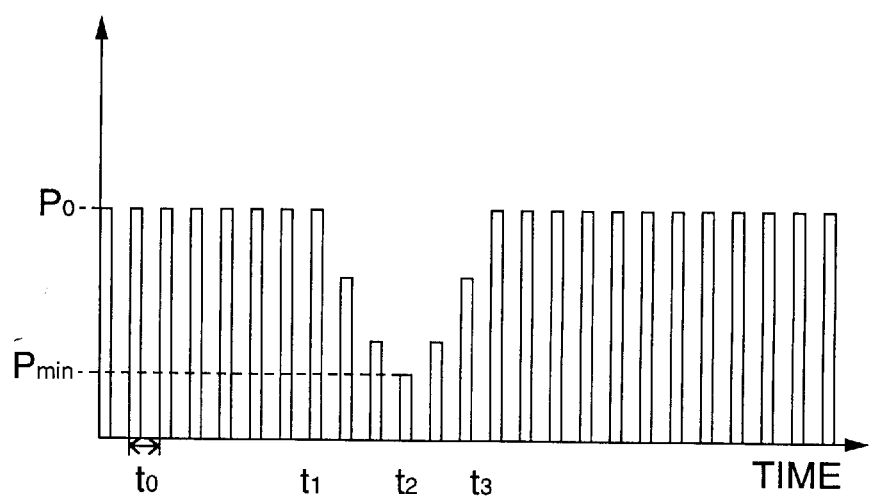

Now, FIG. 14A shows the synchronizing signals that are given to the drive circuit 15, and FIG. 14B shows the converted pulses (which are referred to as received light pulse signals hereinafter) that are output by the A/D converting part 18, respectively. The synchronizing signal generating part 17 outputs pulse signals each of a constant level every given time interval $t_0$.

The A/D converting part 18 outputs the received light pulse signals each of a given level at a timing in synchronization with the above-mentioned synchronizing signal.

In this case, while no raindrop exists in the detect area 14, the received light pulse signals each of a given level $P_0$ are being output. However, if a raindrop enters the detect area 14 (that is, at the time $t_1$), then the level of the received light pulse signal is decreased and, when the raindrop has entered the detect area 14 completely (that is, at the time $t_2$), then the level of the received light signal provides the minimum value $P_{min}$. After then, if the raindrop leaves from the detect area completely (that is, at the time $t_3$), then the received light pulse signal returns to the original level $P_0$.

Referring back again to FIG. 13, the control device 4 includes a raindrop detect part 19, a raindrop measuring part 20, a threshold value storage part 21, a coefficient value storage part 22, a wiper drive control part 23, an operation mode storage part 24, and the like.

The raindrop detect part 19 receives the received light amount from the A/D converting part 18 of the amplifier unit 3 to understand the level (the above-mentioned level $P_0$) of the pulse signal under the raindrop absence condition and, after then, when the levels of the respective pulses vary, detects the variation values thereof to thereby calculate the minimum value of the received light rate or the varying time of the raindrop.

When it calculates the varying time of the raindrop, the raindrop detect part 19 further takes in the detect signal of a vehicle speed sensor 47 provided within the vehicle to measure the running speed of the vehicle, so as to calculate the falling speed of the raindrop using the above-mentioned numeric expression (1).

The minimum value of the received light rate or the falling speed of the raindrop calculated by the raindrop detect part 19 is then output to the raindrop measuring part 20 as the detect data of the raindrop.

The raindrop measuring part 20 takes in the detect data output from the raindrop detect part 19 and performs a given processing (which will be described later) on the detect data, calculates the amount of rain or the number of raindrops as the amount of raindrops, and outputs the thus calculated value to the wiper drive control part 23. The operation mode storage part 24 stores a given threshold value serving as a condition necessary to drive the wiper therein, and the wiper drive control part 23 outputs a drive signal to a wiper drive control circuit 25 when the calculated or measured value output from the raindrop measuring part 20 reaches the given threshold value.

The threshold storage part 21 is used to store threshold values respectively necessary to classify the raindrops that have passed through the strip-shaped light 8 by size, by use of the raindrop detect data of the raindrop detect part 19. The coefficient value storage part 22 is used to store coefficient values respectively necessary to calculate the amount of rain according to the respective classified groups of the raindrops.

FIGS. 15A, 15B, 16A and 16B respectively show the examples of the threshold values to be stored in the threshold value storage part 21.

Figures 15A, 15B:
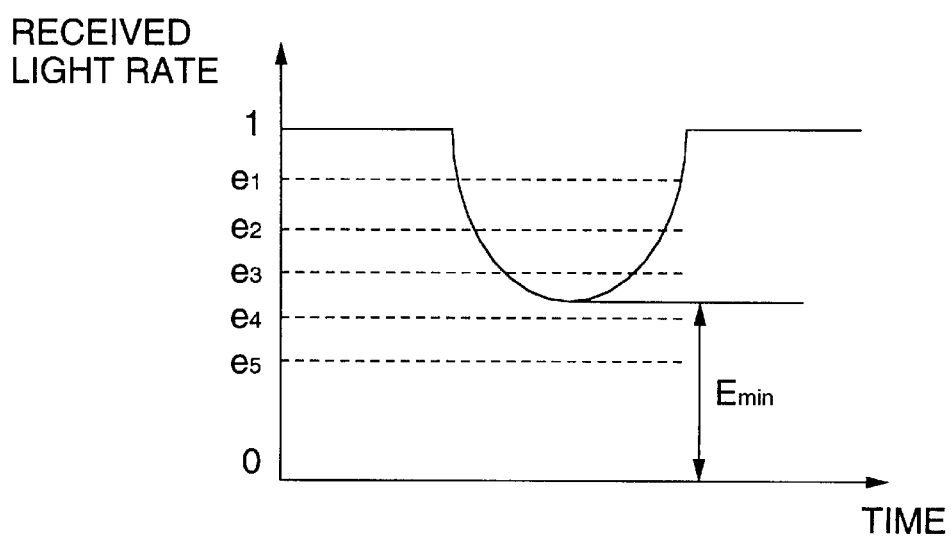
FIGS. 15A and 15B show an example of threshold values used to classify raindrops into groups.

In particular, in FIGS. 15A and 15B, for the received light rate, there are set five threshold values $e_1$–$e_5$ ($e_1 > e_2 > e_3 > e_4 > e_5$) and the raindrops to be detected are classified into five groups $g_1$–$g_5$. The raindrops can be classified into any of the five groups by comparing the minimum values $E_{min}$ of the received light rates calculated by the raindrop detect part 19 with the respective threshold values.

In the illustrate case, the minimum value $E_{min}$ of the received light rate exists between the threshold values $e_3$ and $e_4$ and, therefore, the raindrop is classified into the group $g_4$.

Figures 16A, 16B:
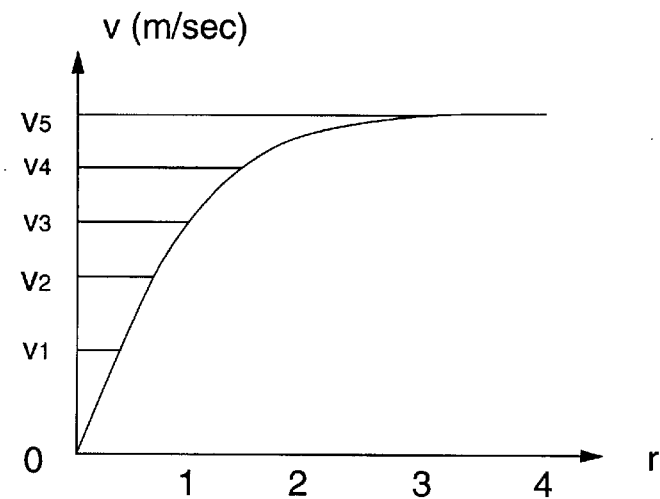
FIGS. 16A and 16B show another example of the threshold values used to classify the raindrops into groups.

In FIGS. 16A and 16B, threshold values are set by use of the relation between the falling speeds and sizes of the raindrops shown in FIG. 10. In particular, five threshold values $v_1$–$v_5$ ($v_1 < v_2 < v_3 < v_4 < v_5$) are set on the axis of the falling speed, and the raindrops to be detected are classified into five groups $g'_1$–$g'_5$.

The method of setting the threshold values is not limited to the above-mentioned method but, alternatively, six or more threshold values can be used and thus the raindrops can be classified into six or more groups. Further, two or more sets of combined threshold values can be established according to the environmental brightness so that any set of the combined threshold values can be selected according to on or off of the light of the vehicle or by the manual operation of the driver.

Now, FIG. 17 shows another electric structure employed in a wiper drive apparatus according to the present invention.

In the above-mentioned light emitting part 5, there are provided a light emitting element 32 and a drive circuit 48 used to drive the light emitting element 32. Also, in the light receiving part 6, there are provided a light receiving element 33, a drive circuit 49 used to drive the light receiving element 33, and an amplifier circuit 50 used to amplify the amount of the light received by the light receiving element 33.

The above-mentioned control device 4' not only includes the raindrop detect part 19, raindrop measuring part 20, threshold value storage part 21, coefficient value storage part 22, wiper drive control part 23 and operation mode storage part 24, but also includes a power supply circuit 52, a band-pass filter 53, an A/D converting part 54, a synchronizing signal generating part 55, and the like.

The power supply circuit 52, while the vehicle is in motion, supplies direct currents continuously to the band-pass filter 53 as well as the drive circuits 48 and 49 of the light emitting and receiving parts 5 and 6.

The band-pass filter 53 permits the passage therethrough only the signals having a given range of frequencies out of the signals of the received light amount that have passed through the amplifier circuit 50, and the signals that have passed through the band-pass filter 53 are output to the A/D converting part 54.

The synchronizing signal generating part 55 generates pulse signals at a given time interval and outputs the thus generated pulse signals to the A/D converting part 54. In accordance with the pulse signals input therein, the A/D converting part 54 converts the signals in an analog amount received from the band-pass filter 53 into pulse signals and then outputs the thus converted pulse signals. As a result of this, the received light pulse signals are given to the raindrop detect part 19 every given time $t_0$.

The structures of the remaining components are similar to the embodiment as shown in FIG. 13 and thus the description thereof is omitted here.

Next, description will be given below of a control procedure which is applied in common to the control devices 4 and 4'.

Figure 18:
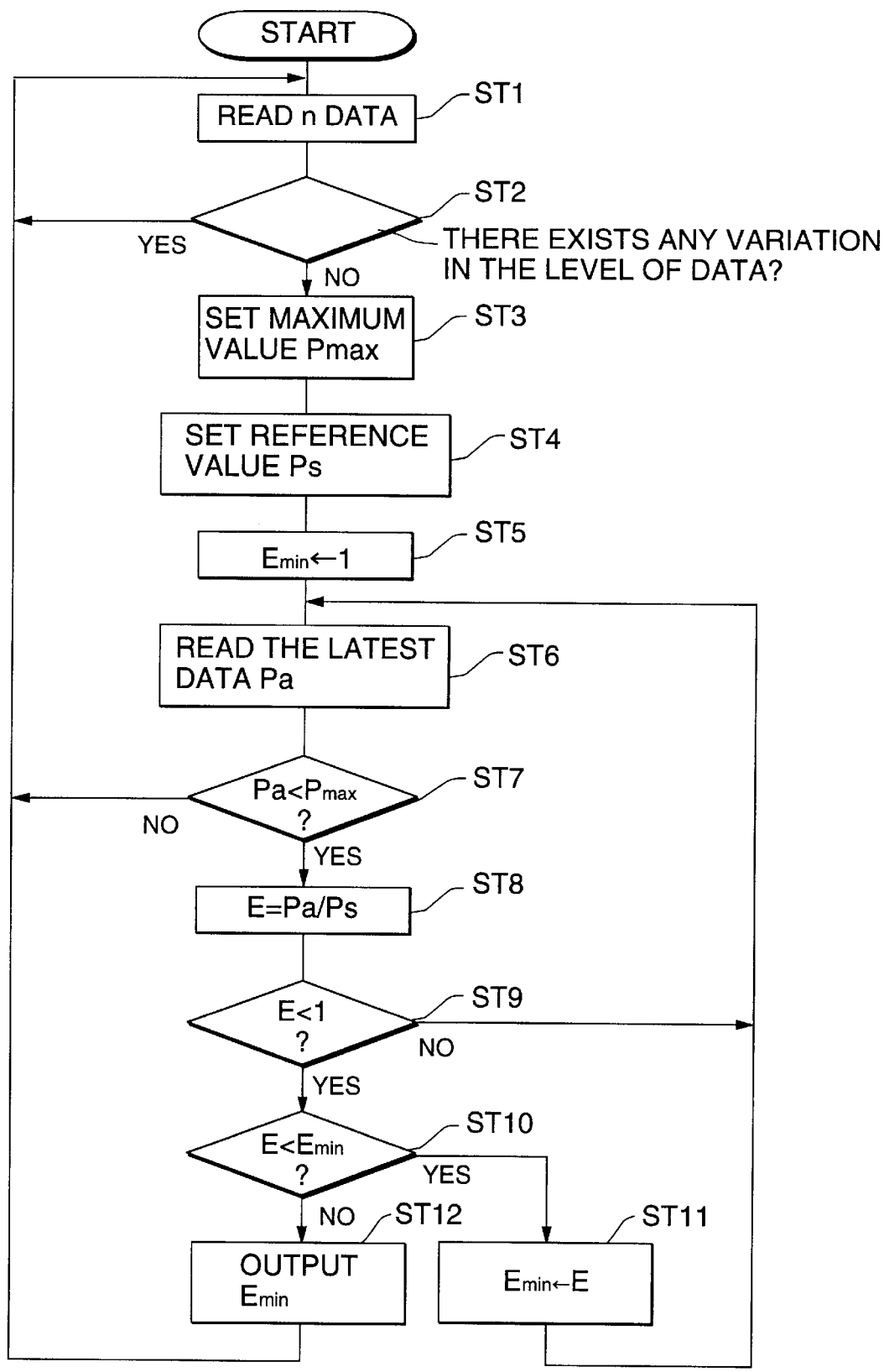
FIG. 18 is a flow chart of a processing procedure for finding the minimum value of the received light rate.
Figure 19:
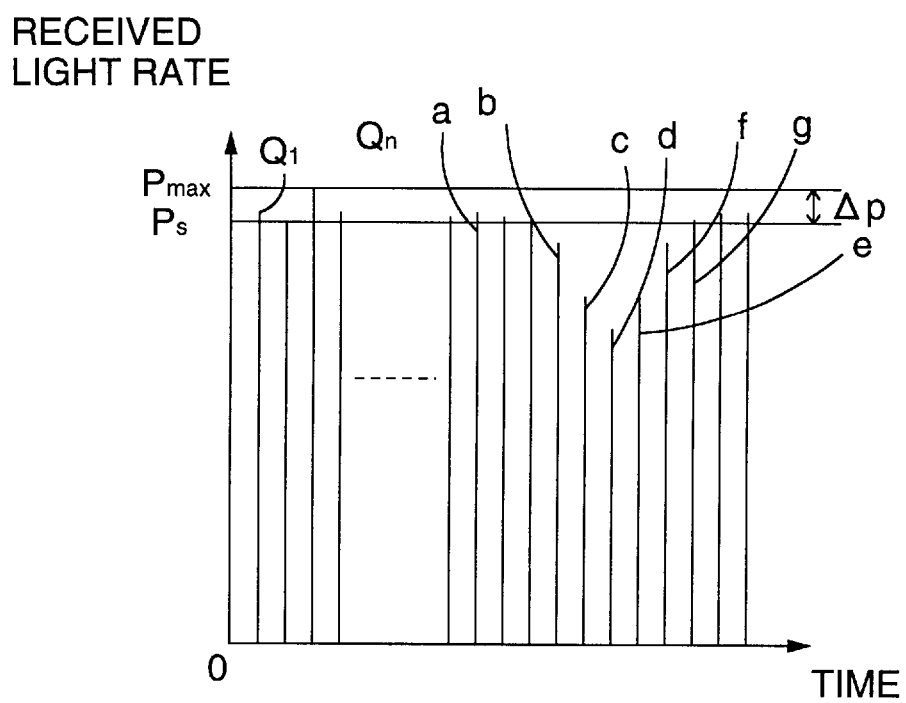
FIG. 19 is a graphical representation of a processing procedure for finding the minimum value of the received light rate.

FIGS. 18 and 19 respectively show a processing procedure which is used to detect the amount of variations in the received light rates by means of the raindrop detect part 19. The procedure will be described below along the respective steps (each step is shown by ST in FIG. 18) with reference to FIG. 19.

In the following description, a reference character Pa designates the received light amount (which is referred hereinafter to as received light data) represented by each of the received light pulses, and $P_{max}$ means the maximum value in the respective received light data. Also, Ps designates a reference value used to detect a variation in the received light rate, E designates the received light rate, and $E_{min}$ designates the minimum value of the received light rate.

In the first stage of the processing, the raindrop detect part 19 sequentially reads the received light pulses from the A/D converting part 18 or 54 and checks whether there exists any variation in the levels of the respective pulses or not (Steps 1 and 2). If the variation in a given number (n pieces) of the received light data read therein is less than a given deviation, then "NO" is indicated in Step 2, and thus the maximum value $P_{max}$ and reference value Ps are set out of the received light data (Steps 3 and 4).

Here, the reference value Ps can be found when a given error Δp based on a variation in the data is subtracted from the maximum value $P_{max}$.

In the next step 5, the raindrop detect part 19, after "1" is initially set as the minimum value $E_{min}$ of the received light rate, reads therein the latest received light data Pa and compares the data Pa with the maximum value $P_{max}$ (Steps 6 and 7).

If the received light data Pa exceeds the maximum value $P_{max}$, then "NO" is indicated in Step 7, and thus the processing goes back to Step 1 and the maximum value $P_{max}$ and threshold value Ps are set again.

If the received light data Pa is less than the maximum value $R_{max}$, then "YES" is pointed out in Step 7. Thus, the raindrop detect part 19 calculates the received light rate E by dividing the received light data Pa by the threshold value Ps and then checks whether the received light rate E is less than "1" or not (Steps 8 and 9).

In the example shown in FIG. 19, n pieces of the received light pulses $Q_1$–$Q_a$ are sampled for setting of the maximum value $P_{max}$ and reference value Ps. The next received light pulse a has a level greater than the threshold value Ps and, in this case, "NO" is indicated in Step 9 and thus the processing moves back to Step 6, in which the next received light data is input. Similar processings are repeated until there is obtained the data that has a level smaller than the threshold value Ps (that is, a received light pulse b in FIG. 19). If the received light pulse b is obtained, then "YES" is indicated in Step 9 and thus the processing goes to Step 10, in which the raindrop detect part 19 confirms that the then received light rate E is smaller than the minimum value $E_{min}$. After then, the raindrop detect part 19 updates the value of the minimum value $E_{min}$ (Step 11) and the processing goes back again to Step 6, in which the next data is input.

In the example shown in FIG. 19, two pulses c and d following the received light pulse b are sequentially decreased in level and, between these pulses, the processing in Steps 6–11 are performed repeatedly and the minimum value $E_{min}$ of the received light rate is then updated.

If the received light rate E calculated from the new received light data Pa exceeds the minimum value $E_{min}$ (that is, in the case of a received light pulse e in FIG. 19), then "NO" is indicated in Step 10 and thus the raindrop detect part 19 outputs the minimum value $E_{min}$ of the received light rate, namely, in the illustrated example, the received light rate obtained in the received light pulse d is output.

Figure 20:
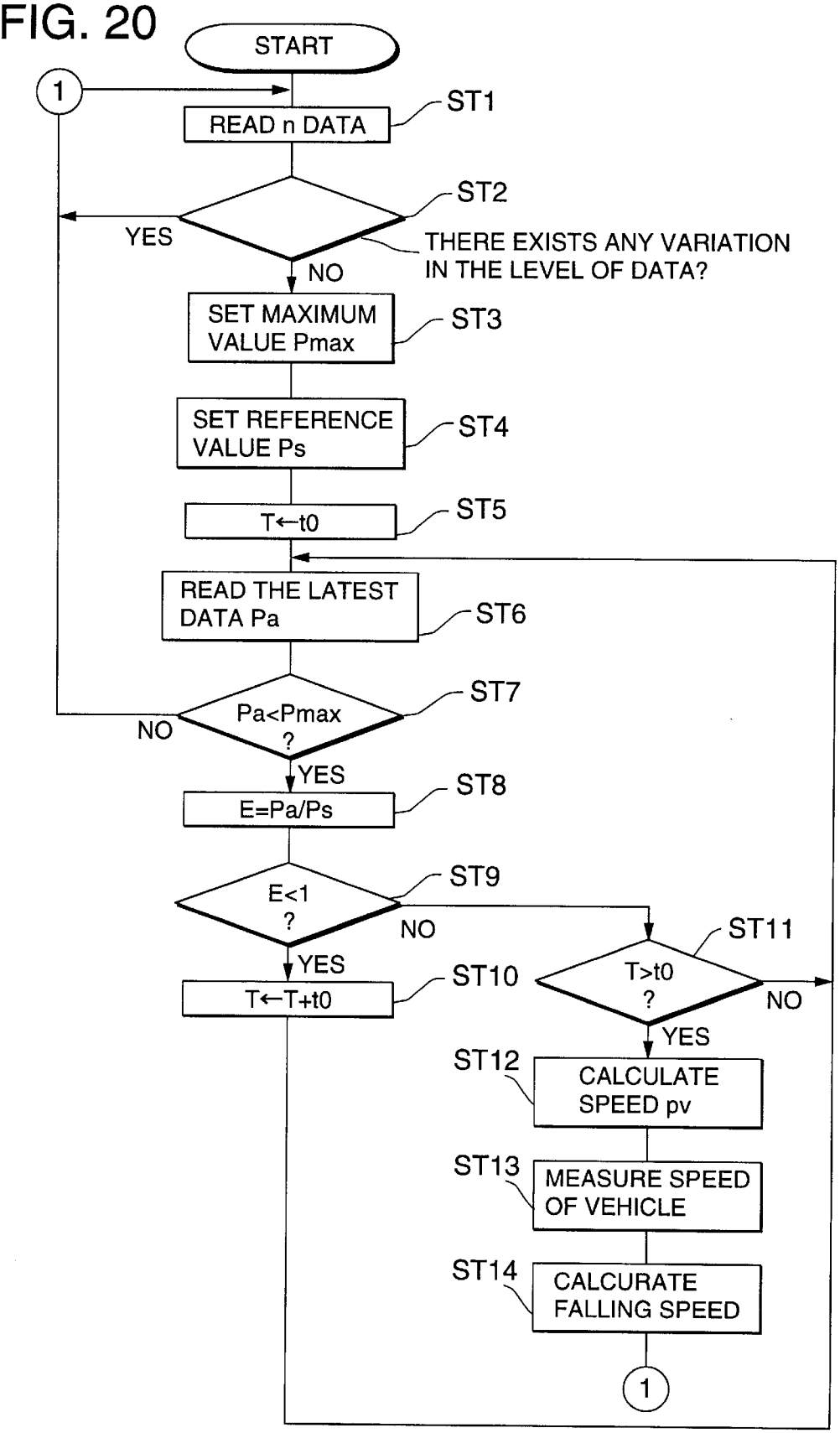
FIG. 20 is a flow chart of a processing procedure for finding the falling speeds of raindrops based on the varying time of the received light rate.
Figure 21:
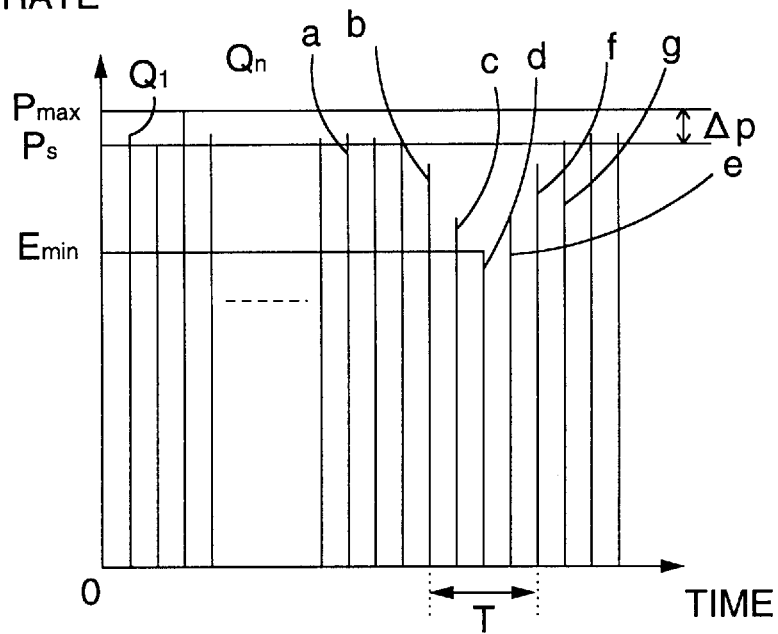
FIG. 21 is a graphical representation of a processing procedure for finding the varying time of the received light rate.

Now, FIGS. 20 and 21 show a procedure in which the varying time of the received light rate is detected so as to calculate the falling speed of the raindrop from the thus detected result.

In this case as well, the raindrop detect part 19 at first samples a given number (namely, n pieces) of received light data and sets the maximum value $P_{max}$ and reference value Ps and, after then, sets initially the time interval $t_0$ (which is shown in FIG. 14) between the above-mentioned pulses for the varying time T of the received light rate (Steps 1–5).

Next, the latent received light data Pa is read and, if the received light rate E based on the data Pa becomes smaller than 1, then the raindrop detect part 19 updates the varying time T by use of the time interval to between the pulses (Steps 6–10).

In the example shown in FIG. 21, the processing in Steps 6–10 are performed on the received light pulses b–f and the varying times T are updated sequentially. In the next received light pulse g, the received light data exceeds the reference value Ps and, in this case, the received light rate is larger than 1, with the result that "NO" is pointed out in Step 9. In accordance with the "NO" judgment, the raindrop detect part 19 confirms that the then varying tim T is greater than $t_0$ and, after then, the raindrop detect part 19 uses this varying time T to calculate the speed pv of the raindrop at which the raindrop has passed through the strip-shaped light 8 (Steps 11 and 12).

Next, the raindrop detect part 19 takes in the detect result of the vehicle speed sensor 47 to thereby measure the vehicle running speed cv in Step 13, and thereafter, the raindrop detect part 19 applies the running speed cv and the above passing speed pv to the numeric expression (1) to thereby calculate the falling speed v of the raindrop and outputs the value of the raindrop falling speed v as the detect result (Step 14).

Here, if a loop of the processing in Steps 6–11 are not executed at all and "NO" is indicated in Step 9, the judgment of Step 11 is also pointed as "NO" and the varying time T is not output and the processing goes back to Step 6 so as to read the next received light data.

Figure 22:
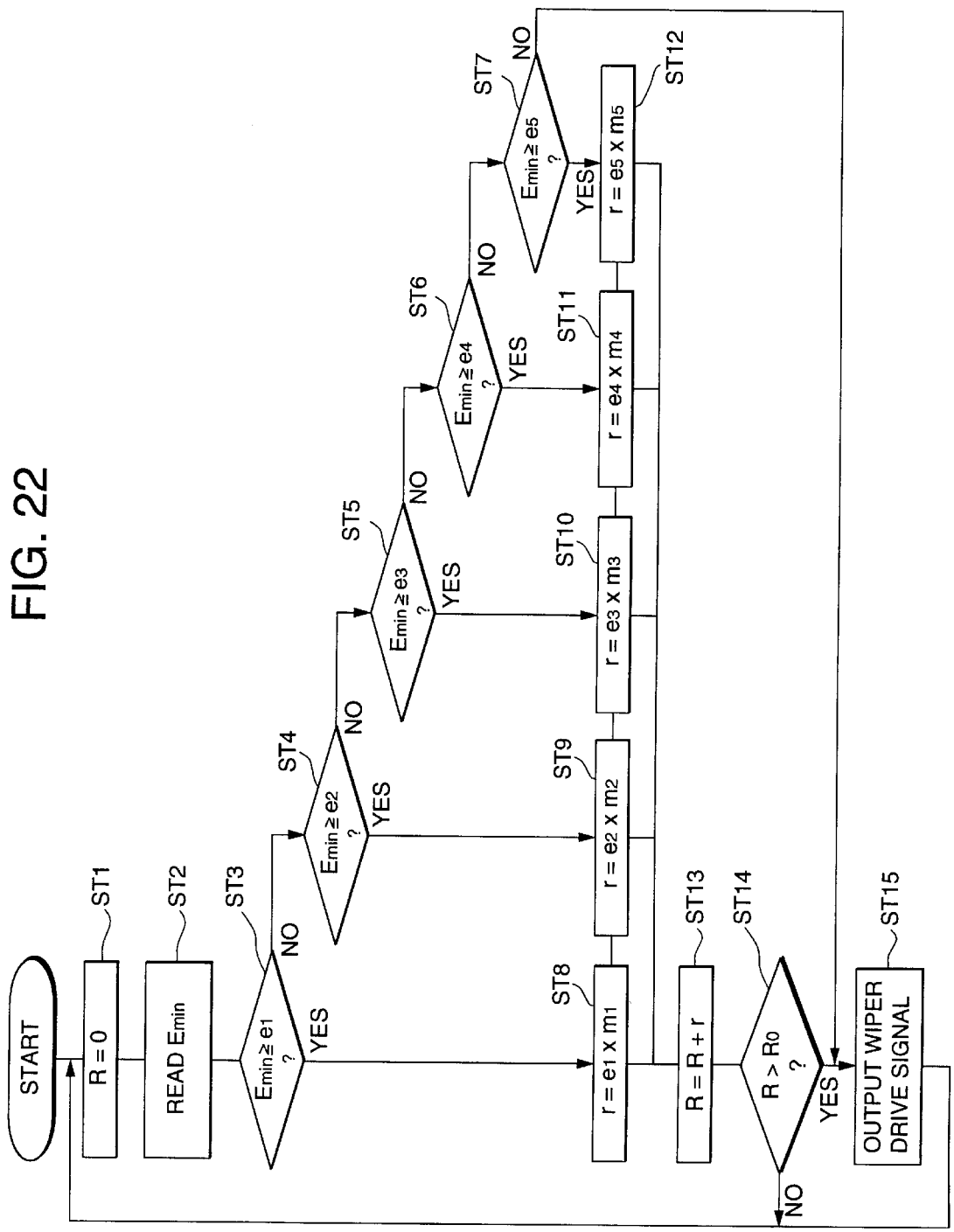
FIG. 22 is a flow chart of a procedure for controlling the driving of the wiper based on the amount of rain.

Now, FIG. 22 shows a procedure to calculate the amount of rain using the minimum value $E_{min}$ of the received light rate detected according to the procedure shown in FIG. 18, thereby controlling the operation of the wiper. The procedure shown in FIG. 22 is executed by the raindrop amount measuring part 20 and wiper drive control part 23. In the following description, R designate the amount of rain to be calculated, and $R_0$ stands for a threshold value which is stored in the operation mode storage part 24 and is used to drive the wiper. Also, $m_1$–$m_5$ respectively point out coefficient values (which are to be stored in the above-mentioned coefficient value storage part 22) necessary to calculate the volume of the raindrops which are respectively classified into the above-mentioned groups $g_1$–$g_5$ (shown in FIG. 15).

The raindrop amount measuring part 20, at first sets the amount of rain R for "0" initially in Step 1 and, thereafter, in Step 2, it reads therein the minimum value $E_{min}$ of the received light rate detected by the raindrop detect part 19.

As shown in FIG. 9, the variation value of the received light rate is in proportion to the diameter of the raindrop. Accordingly, the size of the raindrop can be found from the minimum value $E_{min}$ of the received light rate.

The raindrop amount measuring part 20, at first, compares the minimum value $E_{min}$ of the received light rate given thereto with the five threshold values $e_1$–$e_5$ to thereby judge to what group the current raindrop belongs (Steps 3–7).

If the detected raindrop belongs to the first group $g_1$, then "YES" is indicated in Step 3 and thus the raindrop amount measuring part 20 multiples the coefficient value $m_1$ set for the group $g_1$ by the threshold value $e_1$ to thereby calculate the approximate value r of the volume of the raindrop (Step 8).

For the raindrops classified into other groups $g_2$–$g_5$, similarly, the coefficient values for the respective groups are multiplied by their respective threshold values to thereby calculate the approximate values r of the volume of the respective raindrops (Steps 9–12).

Next, the raindrop amount measuring part 20 updates the rain amount R by means of the approximate values r of the volume of the raindrops calculated according to the above mentioned procedure, so as to output the updated value R (Step 13). The wiper drive control part 23 checks whether the rain amount R reaches a threshold value $R_0$ or not and, if it is found "YES", then the wiper drive control part 23 outputs a drive signal to the wiper drive circuit 25 (Steps 14 and 15).

Figure 23:
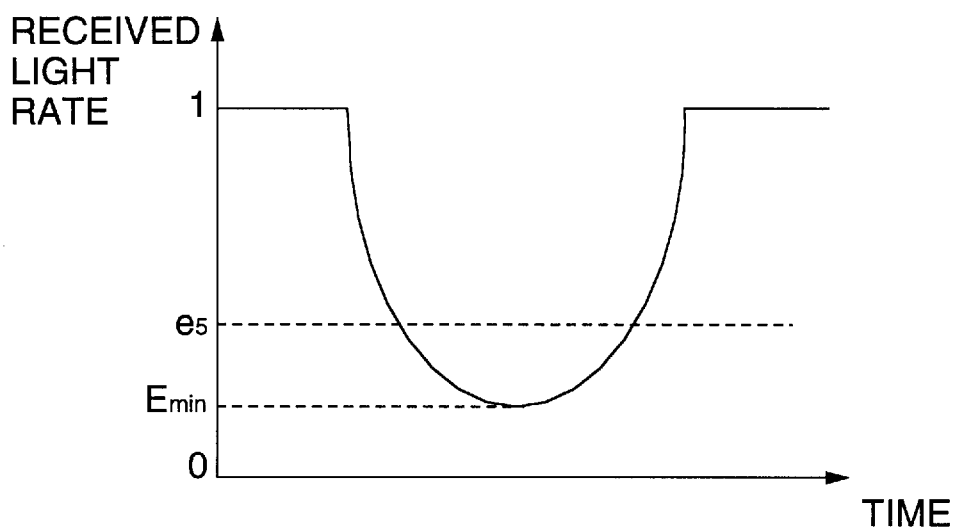
FIG. 23 is a graphical representation explaining a variation in the received light rate due to water splash.

As shown in FIG. 23, if a raindrop (for example, a splash from an oncoming vehicle) larger in size than the greatest raindrop enters the detect area, then the minimum value $E_{min}$ of the received light rate becomes lower than the threshold value $e_5$ of the group $g_5$ to which the greatest raindrop belongs, and thus "NO" is indicated in all of Steps 3 to 7. In this case, the processing goes immediately to Step 15 and a wiper drive signal is output.

Figure 24:
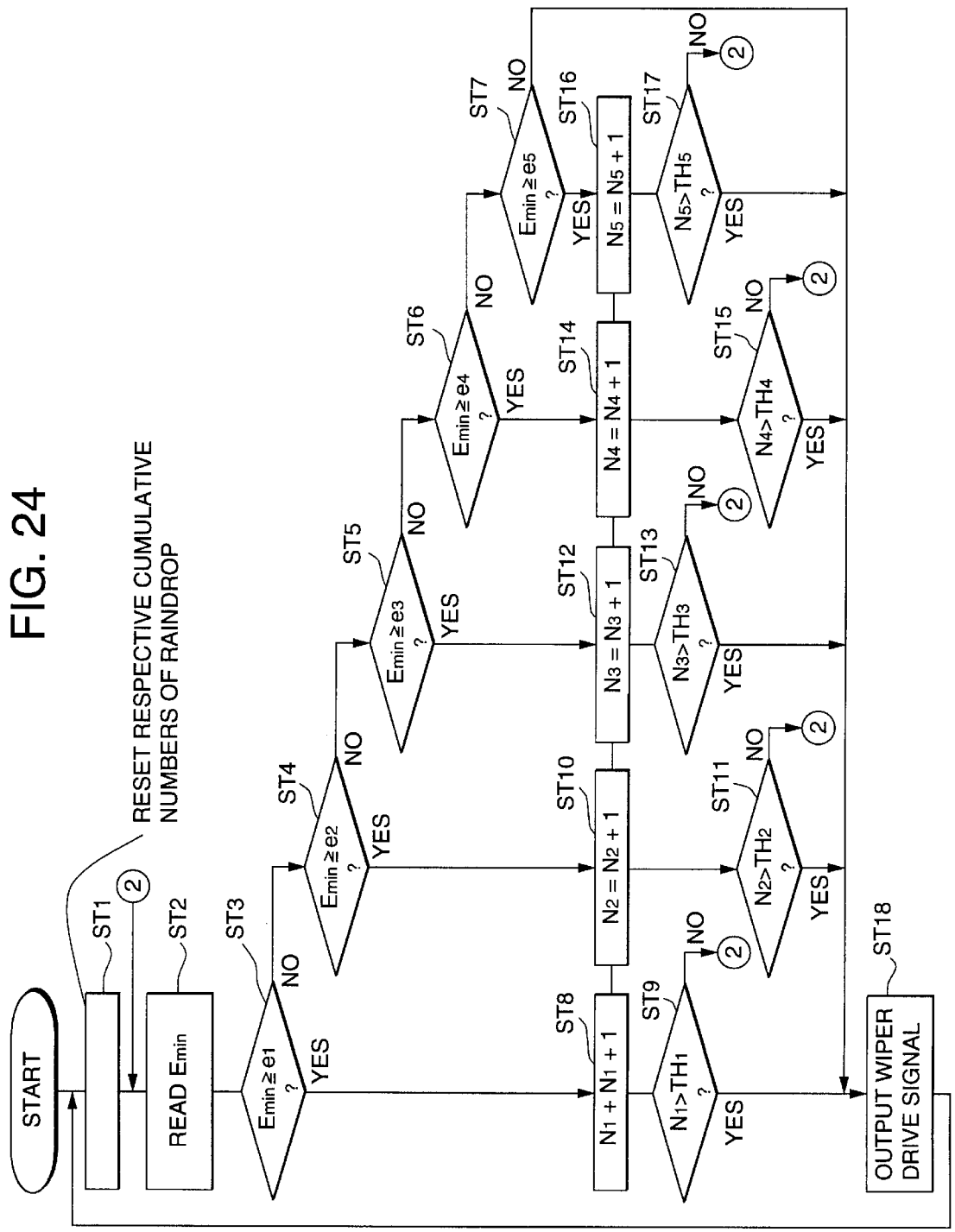
FIG. 24 is a flow chart of a procedure for controlling the driving of the wiper based on the amount of rain.
Figure 25:
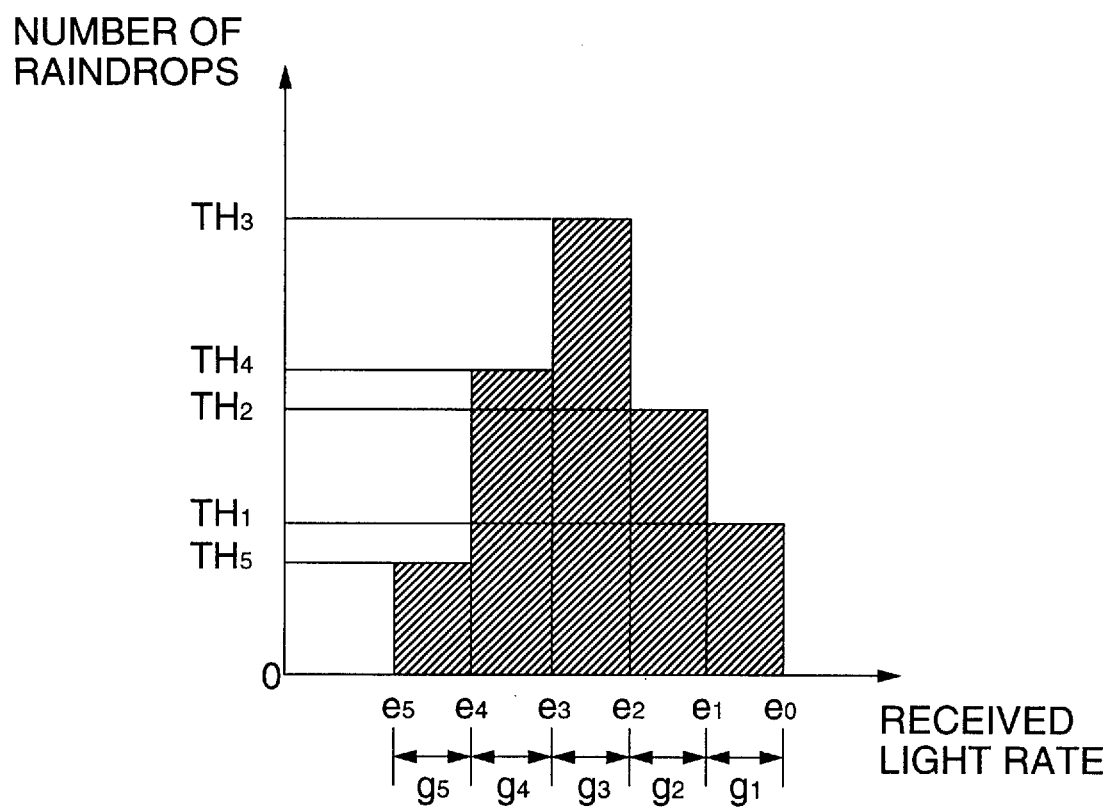
FIG. 25 is a graphical representation explaining an example for setting threshold values used to drive the wiper.

Now, FIG. 24 shows a procedure to calculate the number of raindrops from the minimum value $E_{min}$ of the received light rate to measure the raindrop amount to thereby drive the wiper. In this case, as shown in FIG. 25, given numbers of raindrops TH1–TH5 are respectively set as the threshold values of the groups $g_1$–$g_5$, and the thus set threshold values TH1–TH5 are stored in the operation mode storage part 22. The raindrop amount measuring part 20 calculates sequentially the cumulative number of raindrops belonging to the respective groups in accordance with the sizes of the raindrops detected. When the cumulative number of the raindrops of any one of the groups exceeds its threshold value, then a wiper drive signal is output from the wiper drive control part 23.

In the following description, $N_1$–$N_5$ respectively stand for the cumulative numbers of the raindrops belonging to the respective groups.

After the respective cumulative numbers $N_1$–$N_5$ of the raindrop are set for 0 in Step 1, similarly to the procedure shown in FIG. 22, the minimum value $E_{min}$ of the received light rate is input and is compared with the respective threshold values $e_1$–$e_5$ to thereby judge what groups the raindrops belong to (Steps 3–7).

If the detected raindrop belongs to the group $g_K$ (K=1–5), then the raindrops cumulative number $N_K$ of the group $g_K$ is increased by the raindrop measuring part 20 (Steps 8, 10, 12, 14, 16). The wiper drive control part 23 compares the raindrops cumulative number $N_K$ with its corresponding threshold value $TH_K$ (Steps 9, 11, 13, 15, 17). If the cumulative number $N_K$ exceeds the threshold value $TH_K$, the wiper drive control part 23 outputs a wiper drive signal (Step 18).

With respect to the falling speed v of the raindrop as well, the raindrops are classified into groups $g'_1$–$g'_5$ using the threshold values $v_1$–$V_5$ shown in FIG. 14, and the amounts of rain and the numbers of raindrops are calculated for the respective groups, and the thus calculated rain amounts and raindrops numbers are then accumulated, thereby being able to control the driving of the wiper.

Figure 26:
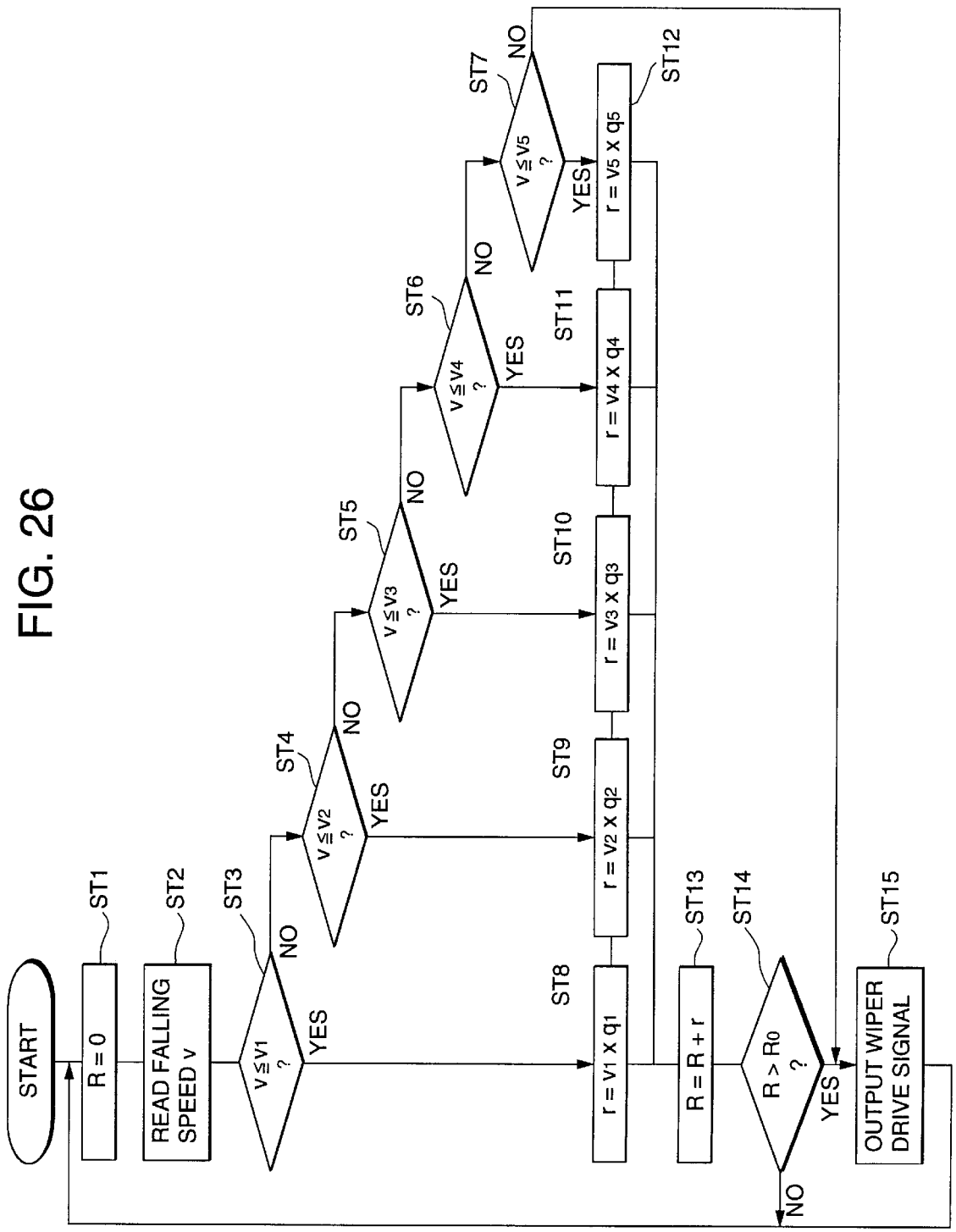
FIG. 26 is a flow chart of a procedure for controlling the driving of the wiper based on the amount of rain.

Now, FIG. 26 shows a procedure in which, after the raindrops are classified according to the falling speeds v of the raindrops, the amount of rain is found to thereby control the driving of the wiper. In FIG. 26, $q_1$–$q_5$ respectively designate coefficient values which are stored in the coefficient value storage part 22 in order to calculate the rain amounts for the respective groups $g'_1$–$g'_5$.

This procedure is almost similar to the procedure shown in FIG. 22 and thus the detailed description of this procedure is omitted here.

Figure 27:
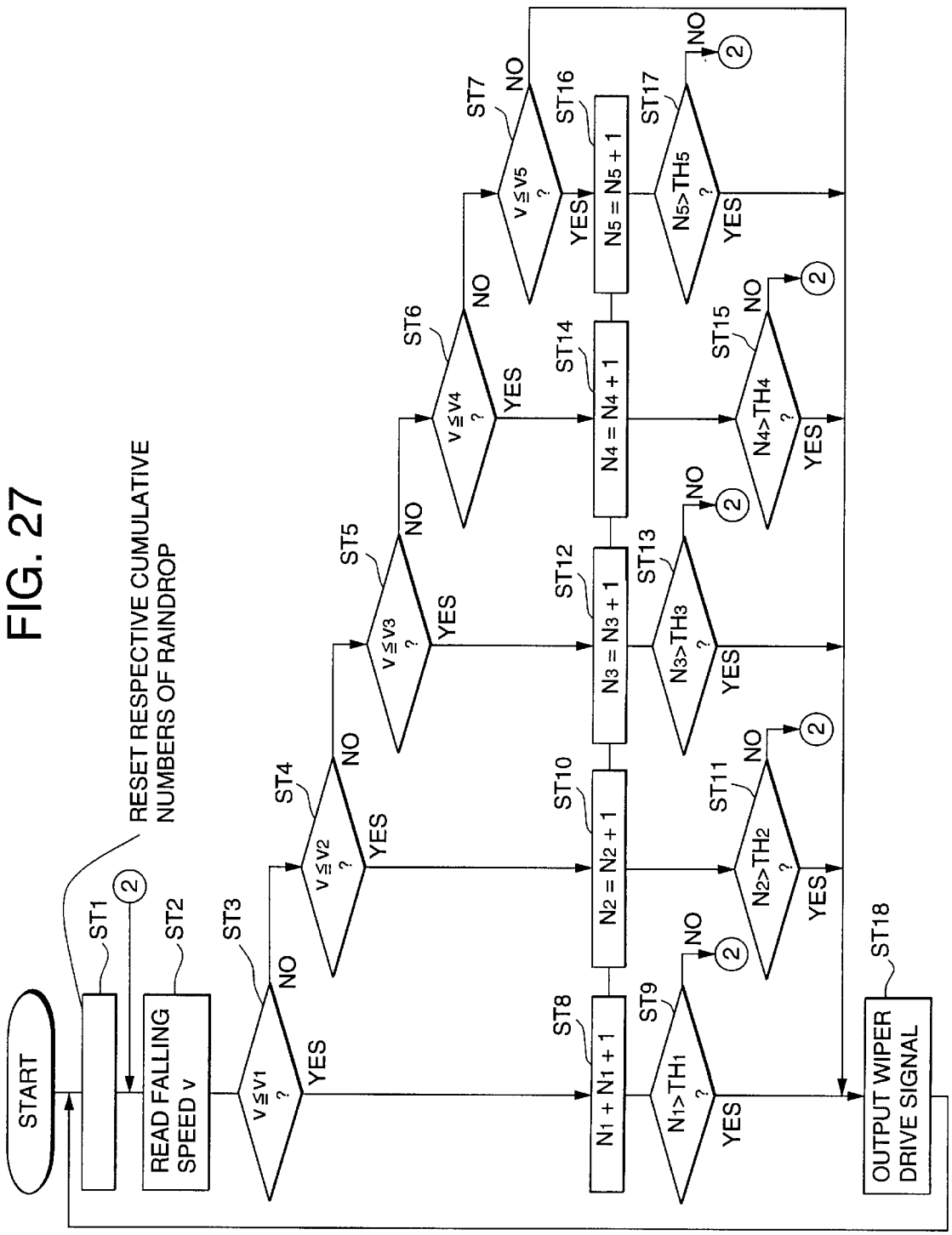
FIG. 27 is a flow chart of a procedure for controlling the driving of the wiper based on the amount of raindrops.
Figure 28:
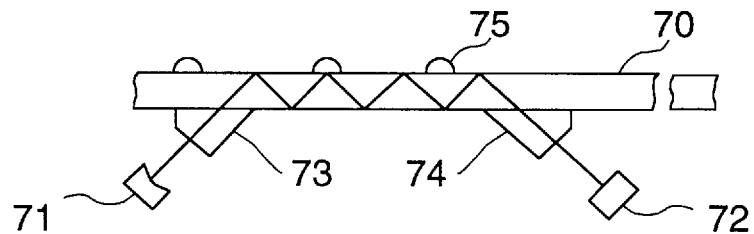
FIG. 28 shows a conventional raindrop sensor.
Figure 29:
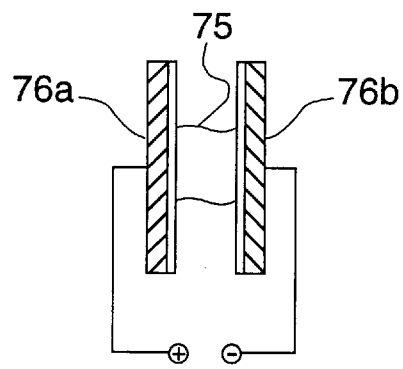
FIG. 29 shows another conventional raindrop sensor.
Figure 30:
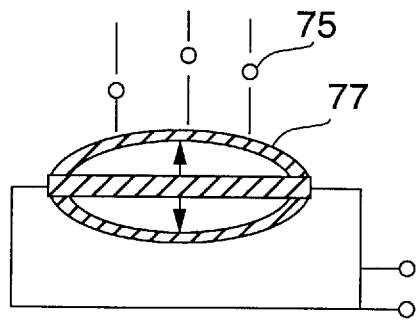
FIG. 30 shows a further conventional raindrop sensor.
Figure 31:
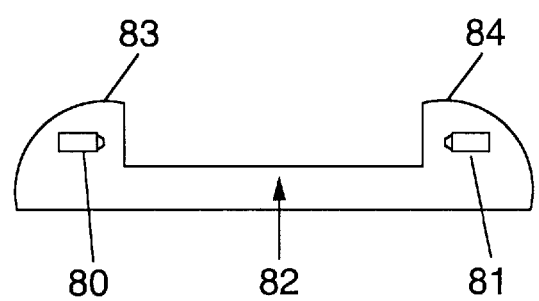
FIG. 31 shows a further conventional raindrop sensor.

Now, FIG. 27 shows a procedure to find the number of raindrops based on the falling speeds v of the raindrops to thereby control the driving of the wiper. This procedure is almost similar to the procedure shown in FIG. 24 and thus the detailed description thereof is omitted here.

In the examples in FIGS. 22 and 26, there is employed a method for calculating the amount of rain in which the threshold values for classification of the raindrops are multiplied by the given coefficient value to thereby find the approximate values of the volume of the respective raindrops, and the amounts of rain are calculated based on the thus obtained volume approximate values. However, the present invention is not limited to this but, alternatively, the minimum value $E_{min}$ of the detected received light rate or the falling speed v of the raindrop can be applied into a given conversion expression.

Also, in the present embodiment, as described before, on the assumption that the raindrop passes perpendicularly to the detect area 14 when the vehicle runs at a normal speed, the light emitting and receiving parts 5 and 6 are disposed in such a manner that the light surface of the strip-shaped light 8 is arranged at an angle of 45° with respect to the horizontal direction. However, if the light emitting and receiving parts 5 and 6 are structured such that the inclination angles thereof can be changed according to the speeds of the vehicle to thereby allow the raindrop to pass perpendicularly to the detect area 14 all the time regardless of the vehicle speeds, then the raindrop can be detected more accurately.

Further, the invention can also be structured in the following manner. That is, a countermeasure against a case where the raindrop cannot be detected for some reason or other, the upper limit value of the non-driving time of the wiper is previously set in the operation mode storage part 24 and, if the non-driving time of the wiper exceeds the upper limit value, then a wiper drive signal can be output.

Moreover, in order to be able to change the condition for driving the wiper according to the drivers or changes of the environmental conditions, a given variation value can be previously set and, as the need arises, the variation value can be added to the threshold values TH1–TH5 shown in FIG. 25.

In the present embodiment, there is illustrated the wiper drive apparatus which measures the raindrop amount by detecting the raindrops one by one and drives the wiper of the vehicle based on the thus measured raindrop amount. However, the invention is not limited to the present embodiment.

That is, according to the invention, other various kinds of application are possible. For example, the present invention can be applied to construction of an information system in which vehicles are connected to a given station by radio, the rain amounts for the respective vehicles are measured according to the above-mentioned method and the thus measured rain amount values are respectively transmitted to the station so that the station side can obtain the rain conditions in the respective places or in the respective vehicles, whereby the station side is able to inform the drivers of the respective vehicles of the rain conditions based on the thus obtained information.

As has been described heretofore, according to the invention, since the raindrop is detected by means of the variation in the received light amount with respect to the strip-shaped light, the raindrop can be detected simply and accurately without being influenced by the externally disturbed light and reflected light.

Figure 33A:
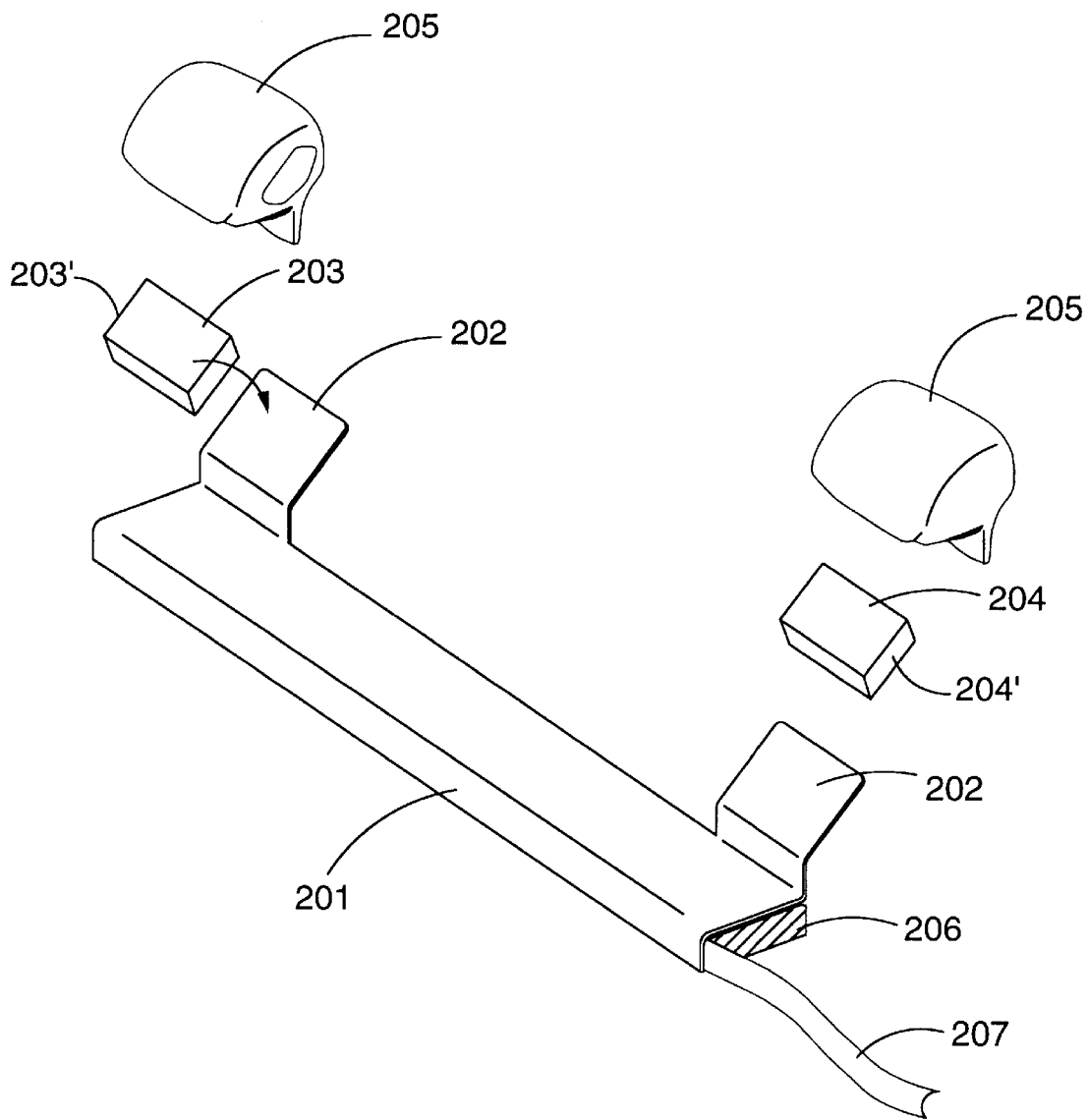
FIGS. 33A and 33B show further embodiment of a raindrop detect sensor according to the present invention.
Figure 33B:
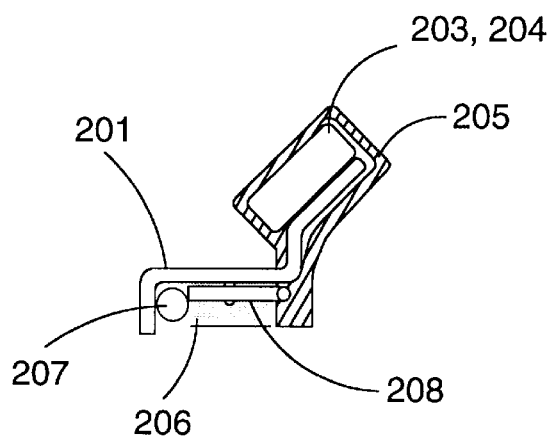

Next, FIGS. 33A and 33B show further embodiment of a raindrop detect sensor according to the present invention. In the drawing, a metal plate 201 has projecting parts 202 and 202 at both end part. The metal plate 201 is fixed to a light emitting part 203 and a light receiving part 204, the metal plate being used as a case. In this case, the metal plate 201 is an optical reference surface. Accordingly, as shown in the drawing, the metal plate 201 has a L-shaped cross section so as to be strong against the vibration and bending.

In addition, as shown in FIG. 33B, the light emitting and light receiving parts fixed to the metal plate 201 and the projecting portions 202 are covered by a waterproof cover 205, and the parts and portions are adhered to the cover 205 by an adhesive. A PWB is provided under the metal plate 201, where is filled with a resin 204. A cables 203' and 204' are respectively drawn out from the light emitting and light receiving parts, and they are connected to a PWB 208. A cable 207 is positioned between the metal plate 201 and the resin 204, and drawn out to the outside.

In this structure, the light emitting part (light receiving part) and the metal plate are simultaneously covered by the waterproof cover so as to prevent the entering of water thereinto. In addition, the appearance of the sensor is only the light emitting part, the light receiving part and the metal plate, which can be smaller than the sensor whole of which is covered by the waterproof sensor. Further, in this structure, only the light emitting and light receiving part is projected from the body of the vehicle when the sensor is mounted on the vehicle.

Figure 34:
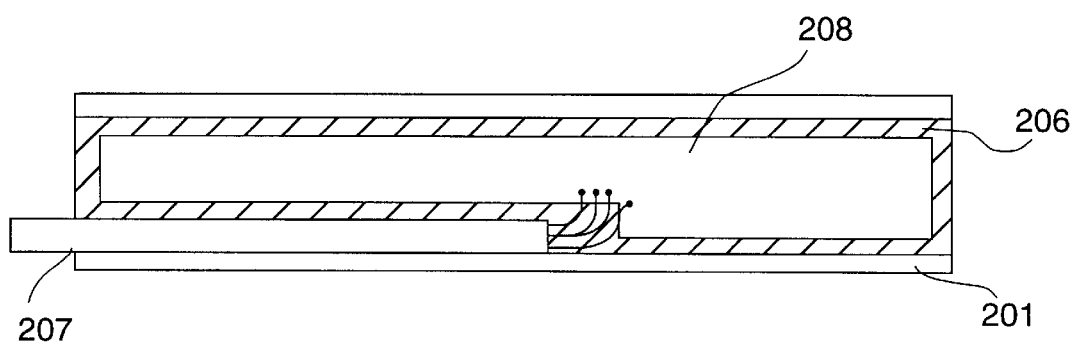
FIG. 34 shows an example drawing out a cable from the raindrop detect sensor.

Next, FIG. 34 shows an example drawing out a cable from the raindrop detect sensor. The cable 207 is inserted into the half of the whole of the sensor, and the sensor is filled with the resin 206 as well as the PWB 208 simultaneously to have a waterproof function. In this structure, the adhering surface between the cable 207 and the resin 206 is caused to be long so as to completely prevent the entering of water from the outer circumference of the cable 207.

Further, in such a structure, fixing circuit parts, fixing the metal plate and getting the water-proof function are simultaneously conducted by the resin. Therefore, resin fillings which take a lot of times can be finished only one time, thereby lowering the producing cost due to decreasing the number of process.

Figure 35A:
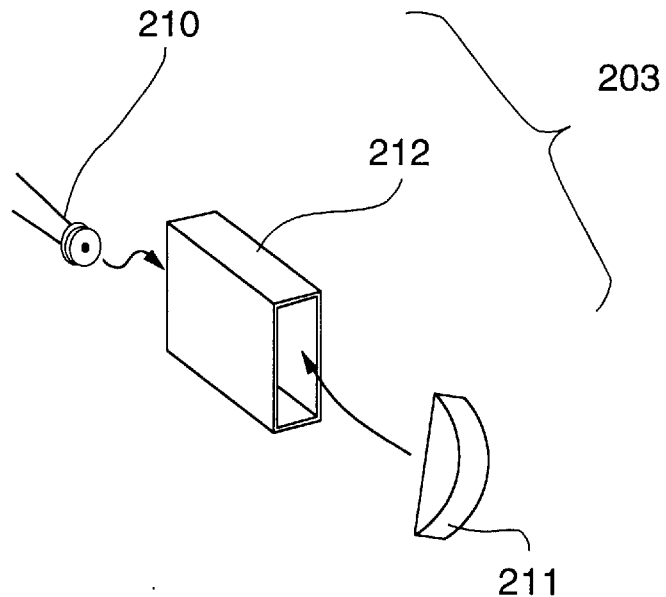
FIGS. 35A and 35B show to assembling a light emitting part and a light receiving part, respectively.
Figure 35B:
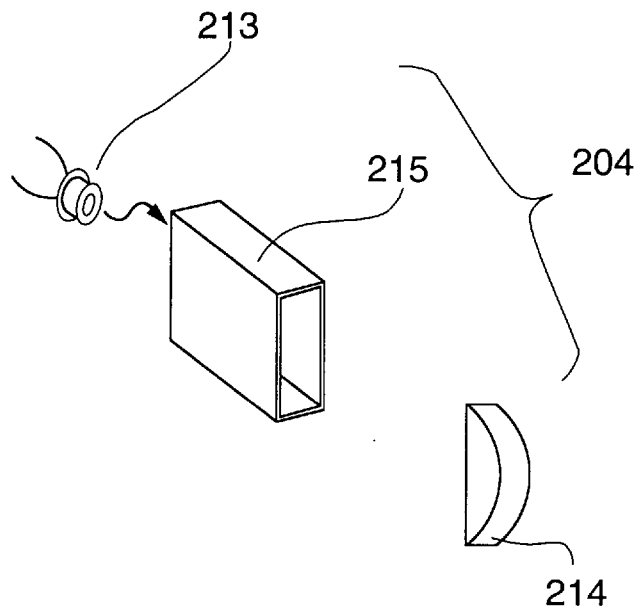

FIGS. 35A and 35B show to assembling a light emitting part and a light receiving part, respectively. The light emitting part 203 has a light emitting element 210 made of LED, a lens 211 and a light emitting part case 212 storing the light emitting element 210 and the lens 211 therein. The light receiving part 204 has a light receiving element 213 made of PD, lens 214 and a light receiving part case 215 storing the light receiving element 213 and the lens 214 therein. Here, the light emitted from the light emitting element 210 is emitted toward the outside of the light emitting part 203 via the lens 211, and the light receiving element 213 receives the light via the lens 214.

Figure 36:
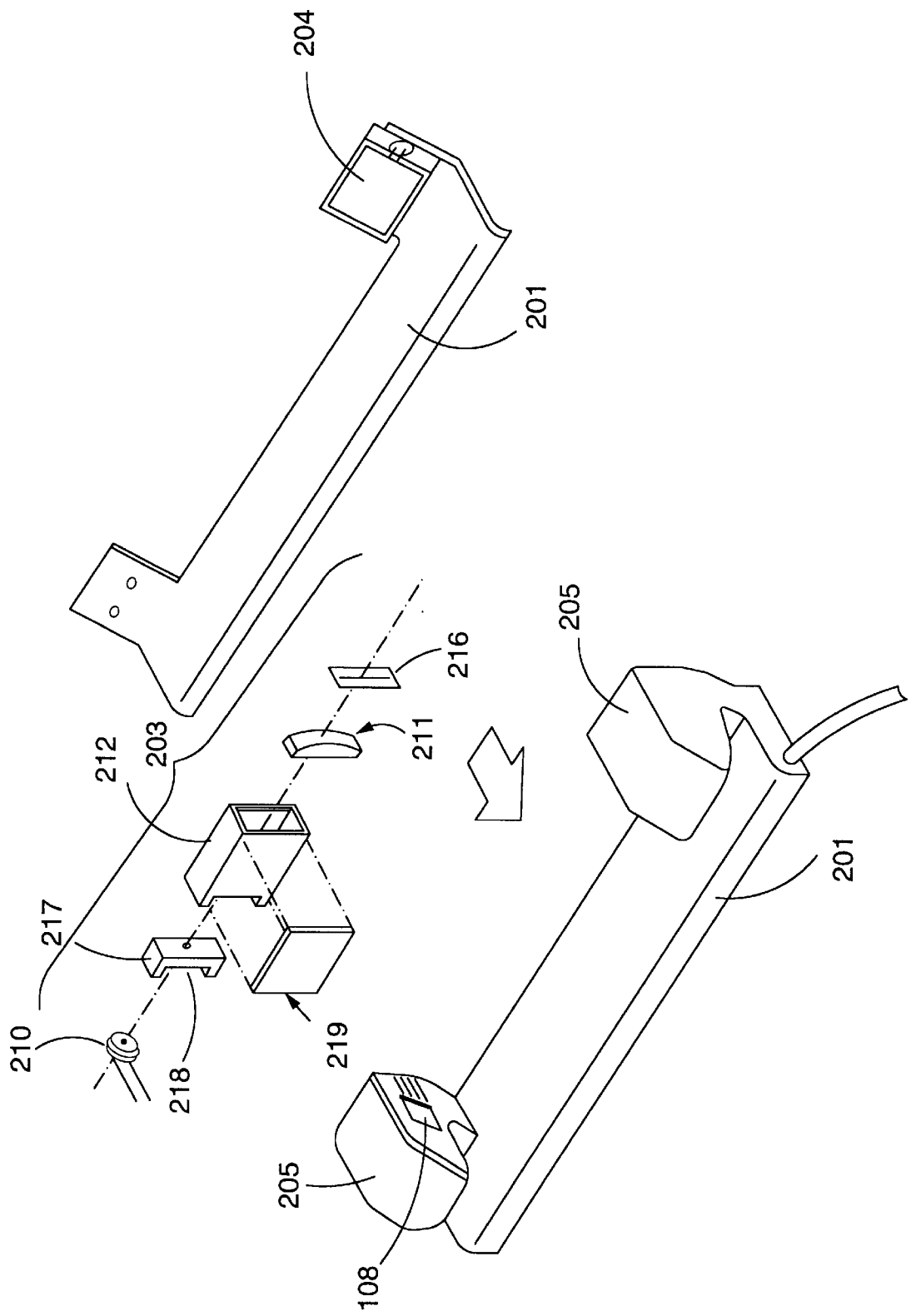
FIG. 36 shows an example how to assemble the raindrop detect sensor according to the present invention.

FIG. 36 shows an example how to assemble the raindrop detect sensor according to the present invention in which the minimum required circuit are provided in the light emitting and receiving portion. The light emitting part 203 has the light emitting element 210, a cap 217 having an opening 218, the light emitting part case 212, a PWB 219 mounted on the side of the light emitting part case 212 in which the required circuits are installed, the lens 211 and a slit 216. These elements are assembled sequentially so as to form the light emitting part 203. The light emitted from the light emitting element 210 sequentially passes the opening 218, the inside of the light emitting part case 212 and the lens 211 so as to be directed toward the light receiving part 204. Such a structure is approximately similar to that of the light receiving part 204. Thus assembled light emitting part and light receiving part are mounted on the respective projecting portions 203 of the metal plate 201 and are covered by the waterproof cover 205 as described above. The waterproof cover 205 has beam passing window 108 for passing the light at respective light emitting part 203 and light receiving part 204.

Even if a feeble signal is used, thus formed sensor has a resistant against a noise because the light emitting element can be disposed near a first amplifier.

Next, how to assemble the raindrop detect sensor according to the present invention on a vehicle will be described as follows. In addition, the optical system of the sensor used in this description is similar to that of FIG. 3.

Figure 37:
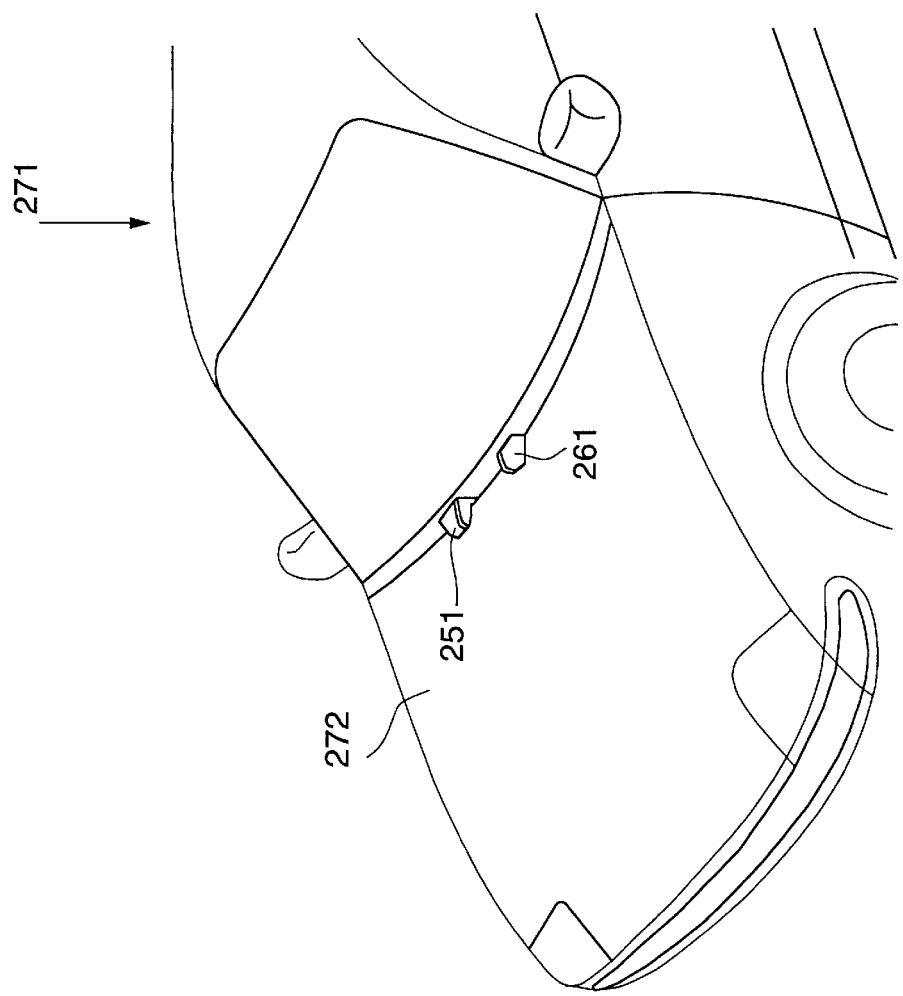
FIG. 37 shows an example in which the sensor is mounted on a bonnet of a vehicle.

FIG. 37 shows an example in which the sensor is mounted on a bonnet of a vehicle. A raindrop detect sensor 241 is mounted on the end portion in a windshield side of a bonnet 272 of a vehicle 271. Accordingly, the sensor can detect the amount of the raindrop near the windshield. Moreover, the sensor can prevent to impede the visual field of a driver and to have an air resistant. In addition, merely a light emitting part 251 and a light receiving part 261 is mounted on the bonnet 272.

Figure 38:
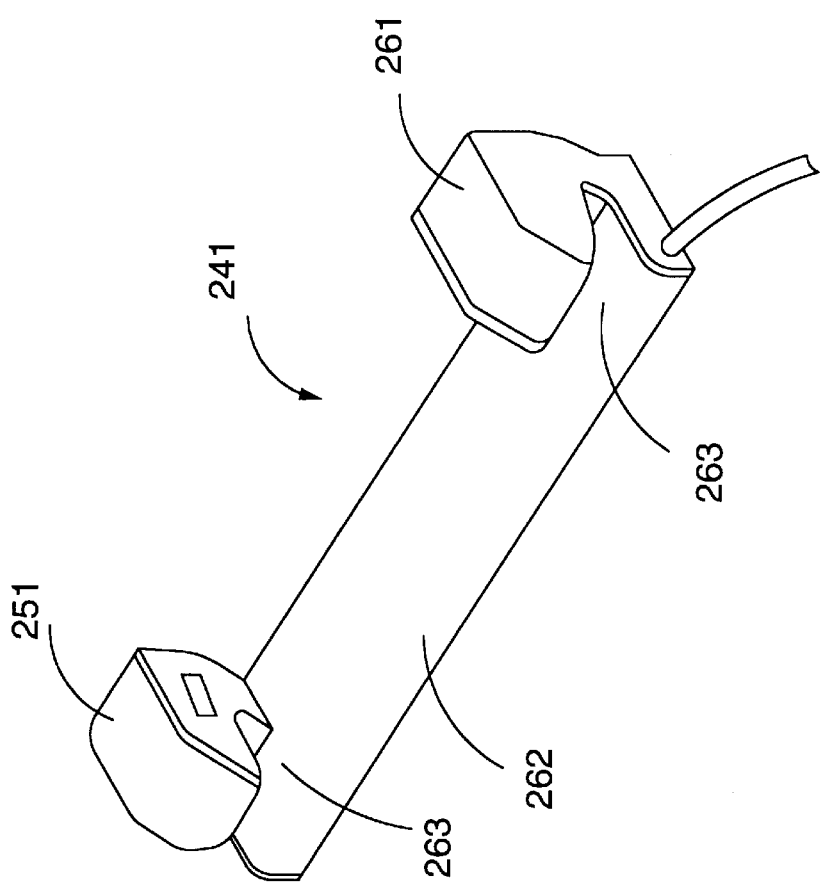
FIG. 38 shows an appearance of the sensor.

FIG. 38 shows an appearance of the sensor. The light emitting part 251 and the light receiving part 261 is provided at both ends of a base member 261 so as to project from the base member 261. It is not care which is the positions of the light emitting part and the light receiving part. The processing circuits for processing the light emitting and receiving are stored in the base member 262. Accordingly, the sizes of the light emitting and receiving parts can be reduced. Each of the light emitting and receiving parts has a slender portion at a section thereof near the base member 262 to form a holding portion 263. The sensor 241 is engaged with the bonnet 272 through the holding portion 263 so as to be fixed to the bonnet 272. Namely, the holding portion 263 holds the end of the bonnet 272. The processing circuits may be stored in respective light emitting and receiving part. In this case, in the light receiving part, since the light emitting element is provided near the light emitting processing circuit, the sensor has a resistance against a noise.

Figure 39:
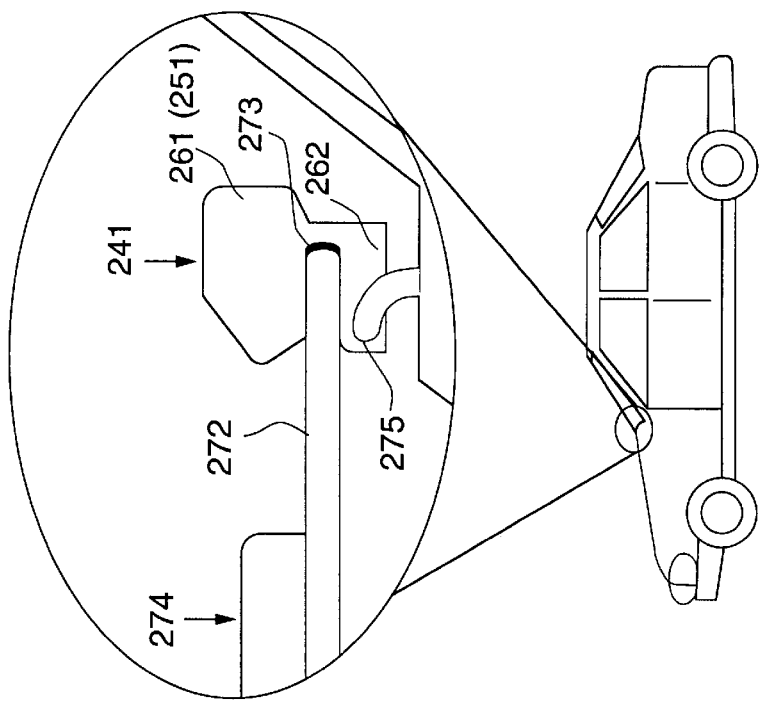
FIG. 39 is a sectional view showing the sensor mounted on the bonnet of the vehicle.

FIG. 39 is a sectional view showing the sensor mounted on the bonnet of the vehicle. The sensor 241 is engaged with the bonnet 272 through the holding portion 263. However, the sensor 241 has an elastic member 273 at a contact portion with the bonnet 272 so as to prevent the bonnet 272 from injury. In addition, reference numeral 274 designates a washer nozzle, and 275 designates a cable.

Figure 40:
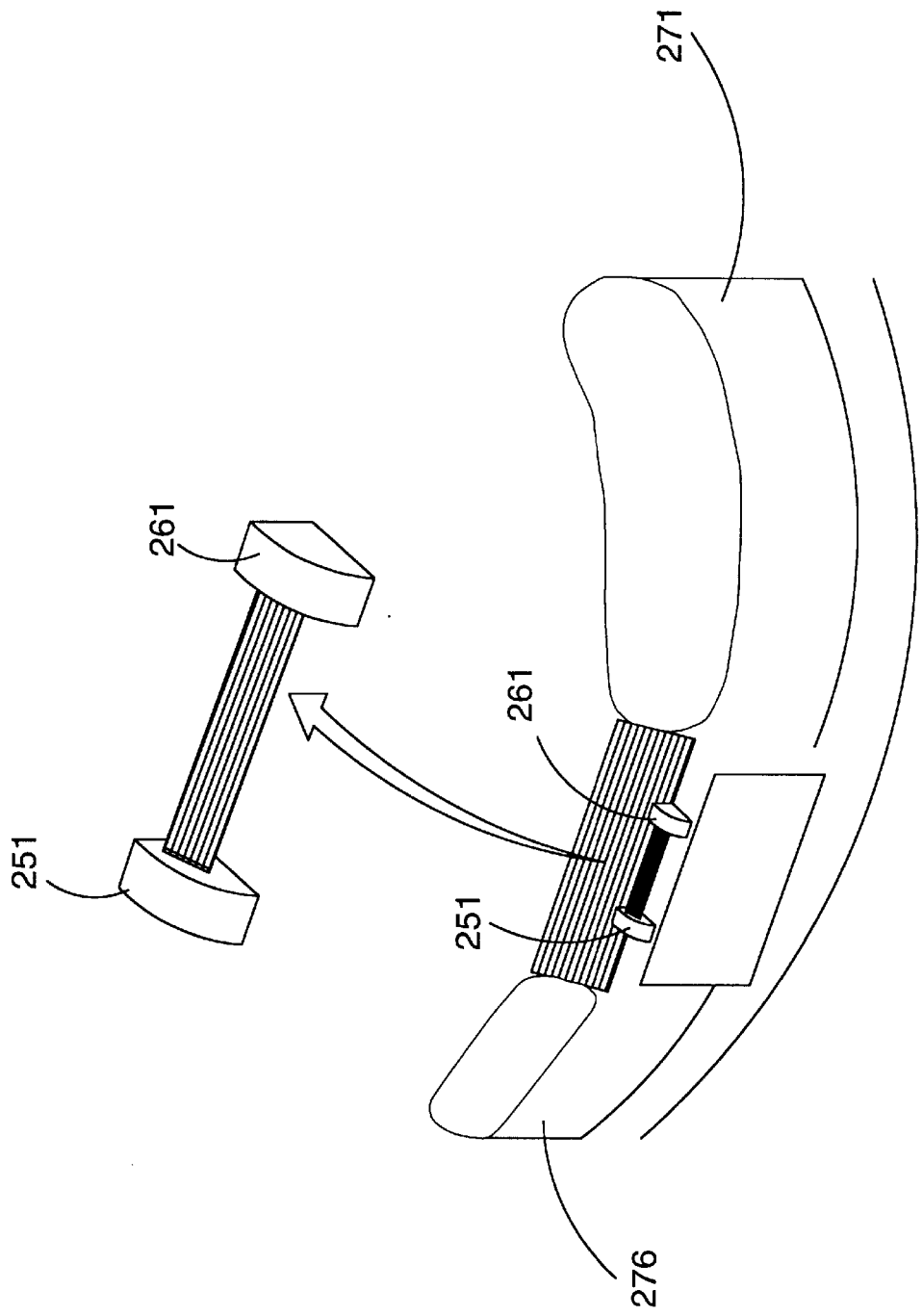
FIG. 40 shows an example in which the sensor is mounted on a bumper of a vehicle.

Next, FIG. 40 shows an example in which the sensor is mounted on a bumper of a vehicle. The sensor 241 having the appearance shown in FIG. 38 is mounted onto a bumper 276 mounted in the front of the vehicle 271, in which merely the light emitting part 251 and the light receiving part 261 is projected from the surface of the bumper 276.

Figure 41:
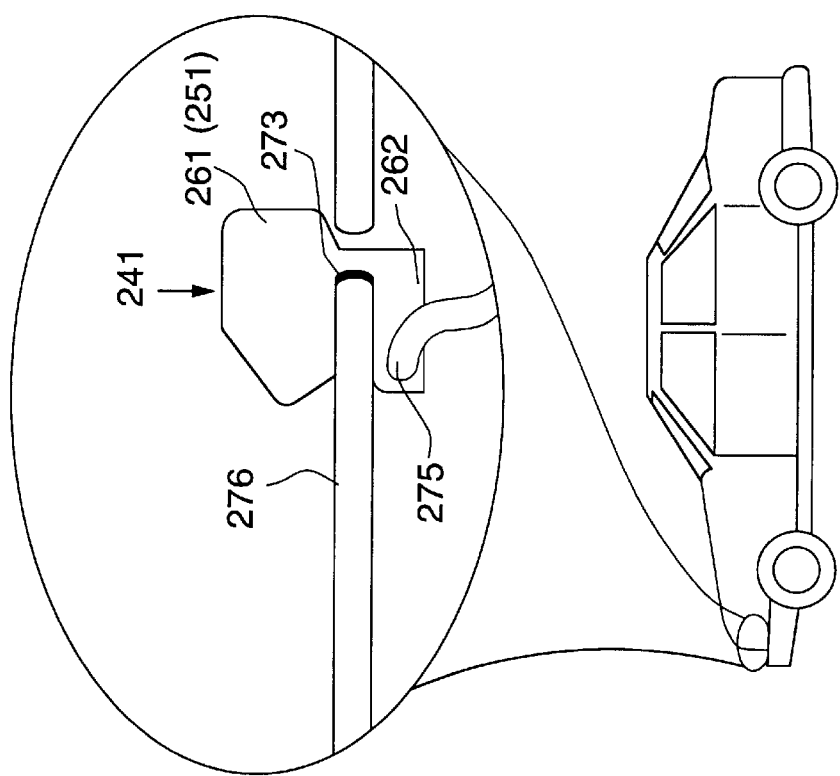
FIG. 41 is a sectional view showing the sensor mounted on the bumper of the vehicle.

FIG. 41 is a sectional view showing the sensor mounted on the bumper of the vehicle 271. Although, the sensor 241 is engaged with the bumper 276 through the holding portion 263, the sensor 241 has the elastic member 273 at a contact portion with the bumper 276 so as to prevent the bumper from injury.

Figure 42:
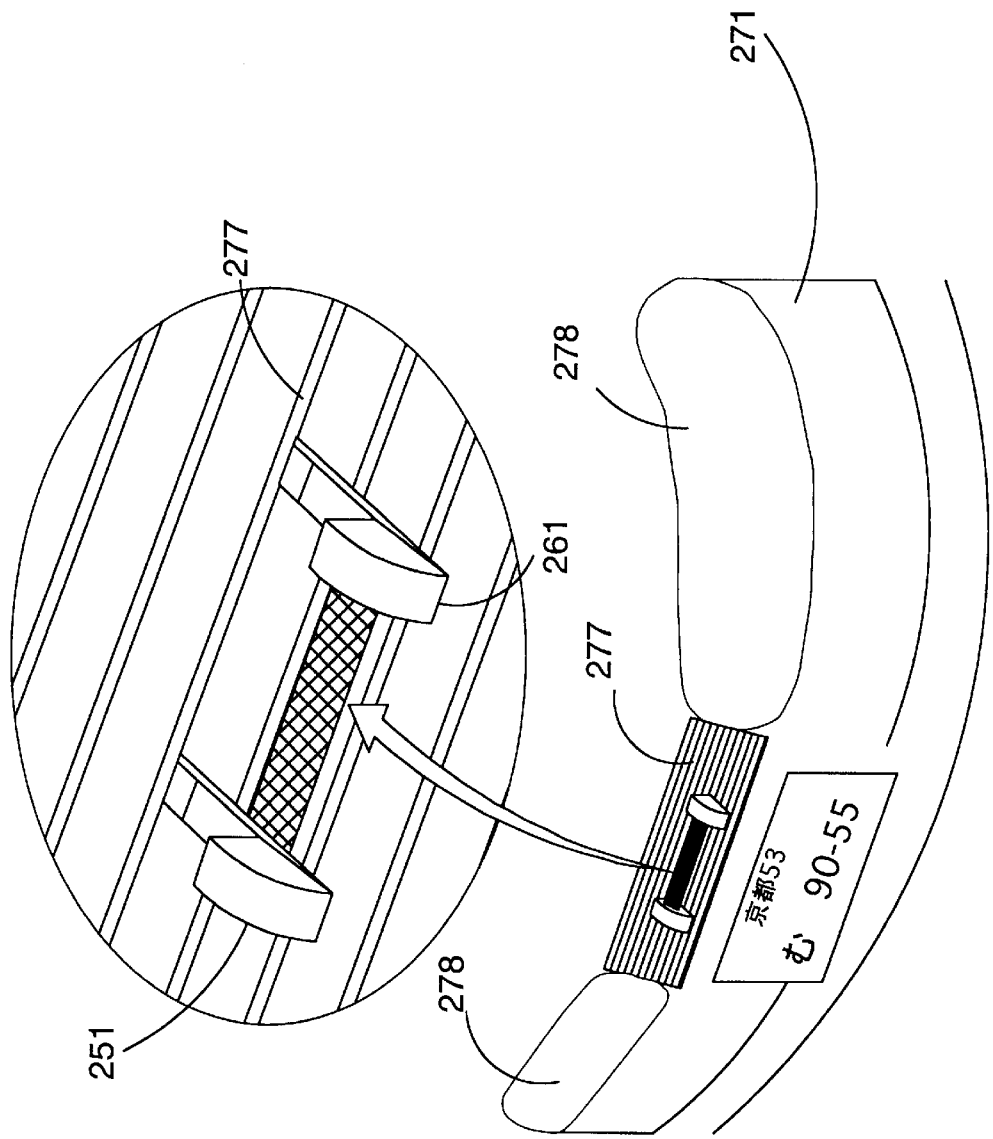
FIG. 42 shows an example in which the sensor is mounted on a front grille of a vehicle.
Figure 43:
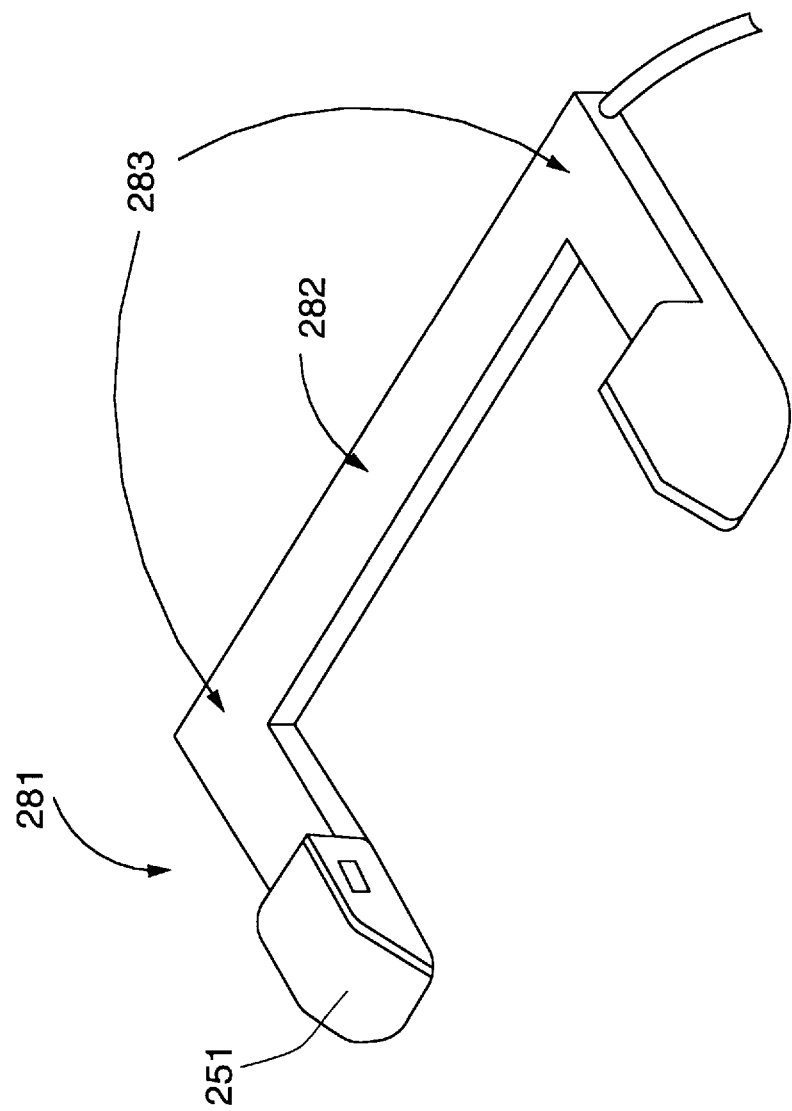
FIG. 43 shows an appearance of the raindrop detect sensor to be mounted on the front grille of the vehicle.
Figure 44:
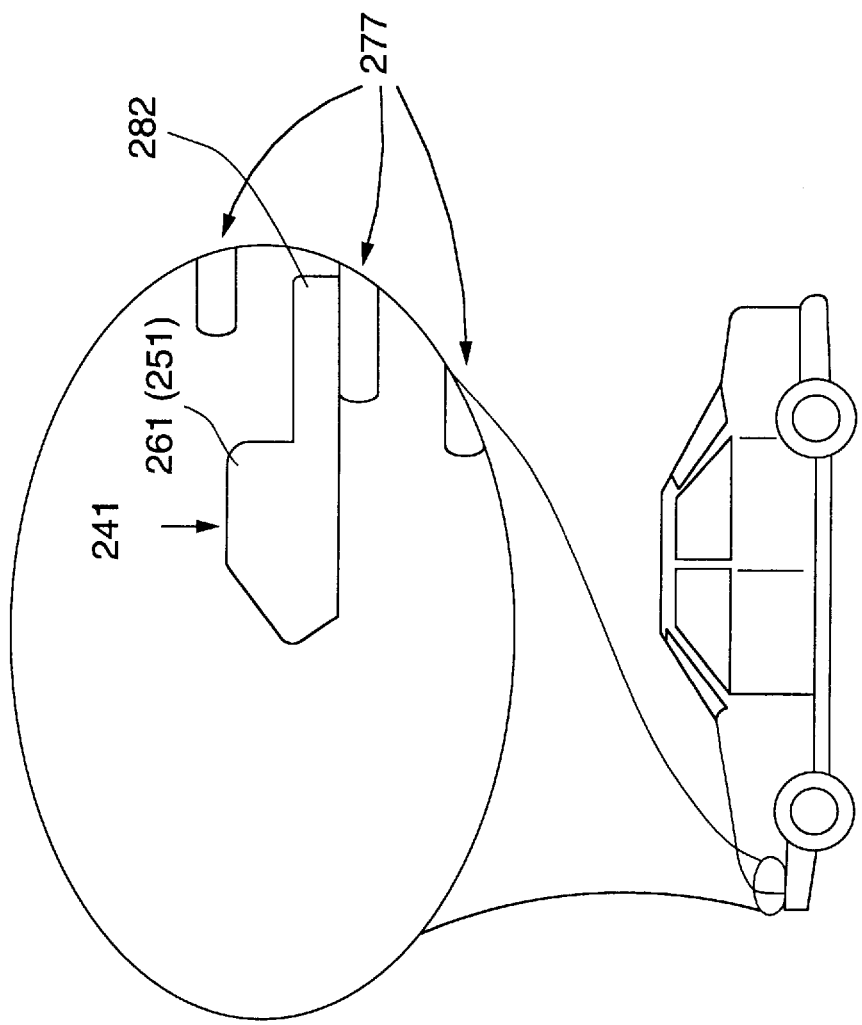
FIG. 44 is a sectional view showing the sensor mounted on the front grille of the vehicle.

Further, FIG. 42 shows an example in which the sensor is mounted on a front grille of a vehicle. The sensor is mounted on the front grille 277 of the vehicle 271 between headlights 278, where cool air is took into a radiator of the vehicle 271. Namely, the sensor is inserted into the vehicle 271 except the light emitting part 251 and light receiving part 261. Accordingly, merely the light emitting part 251 and the light receiving part 261 can be looked from the outside. FIG. 43 shows an appearance of the raindrop detect sensor to be mounted on the front grille of the vehicle. The light emitting part 251 and the light receiving part 261 are mounted at both ends of an U-shaped base member 282, respectively. The base member 282 is used to install the sensor 241 in the vehicle 271. In this time, although whole of or a part of the base member can be used to install. If a part of the base member is used, it is preferable to used bending portions 283 to be installed in the vehicle 271. FIG. 44 is a sectional view showing the sensor mounted on the front grille of the vehicle. The sensor 281 is mounted on the front grille 277 through the base member 282. In this case, the sensor 281 is provided so as to be in front of the front grille 277.

Figure 45:
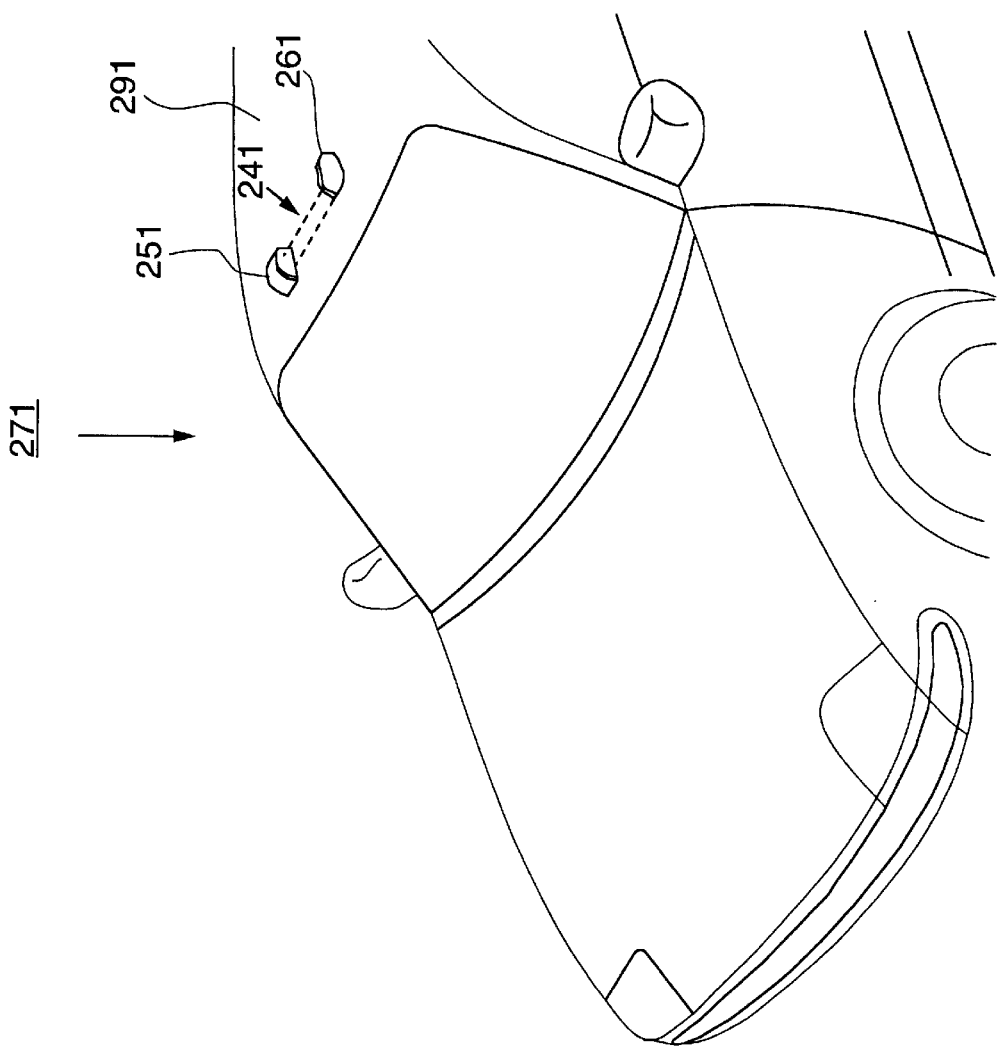
FIG. 45 shows an example in which the sensor is mounted on a roof of a vehicle.
Figure 46:
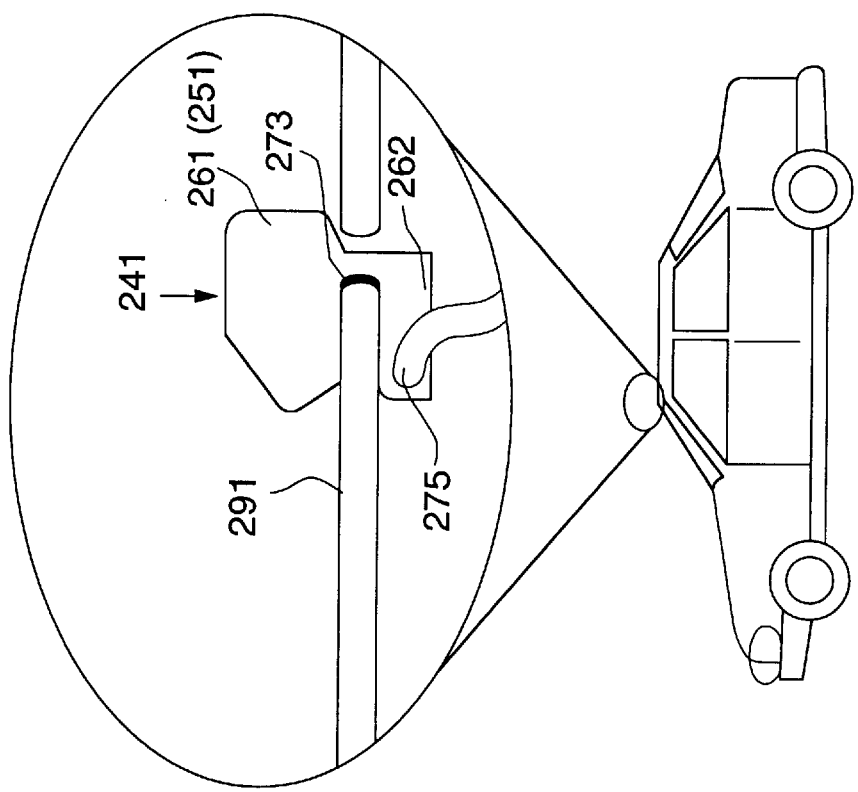
FIG. 46 is a sectional view showing the sensor mounted on the roof of the vehicle.

Further, FIG. 45 shows an example in which the sensor is mounted on a roof of a vehicle. The sensor 241 is mounted on the roof 291 of the vehicle 271 so that merely the light emitting and receiving parts project from the roof 291. FIG. 46 is a sectional view showing the sensor mounted on the roof of the vehicle. The sensor 241 is engaged with the roof 291 through the holding portion. However, the sensor 241 has the elastic member 273 so as to prevent the roof 291 from injury.

Figure 47:
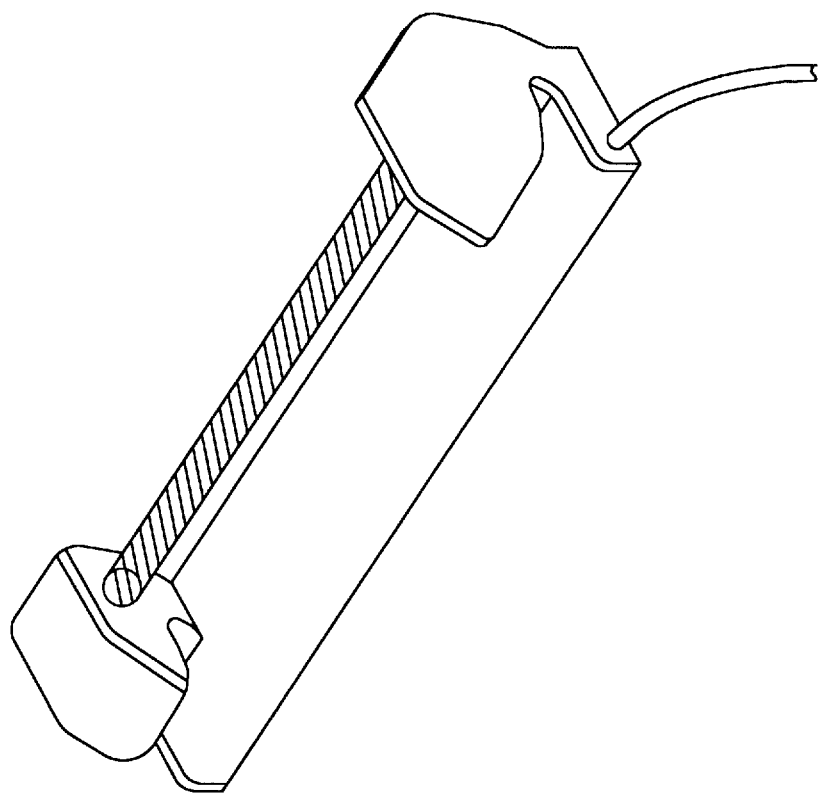
FIG. 47 shows an example of a parallel beam except a strip-shaped light.

Furthermore, FIG. 47 shows an example of a parallel beam except a strip-shaped light. Such a beam is a tube-shaped parallel beam which is accomplished by not providing the slits 30 and 31 shown in FIG. 3. The tube-shaped parallel beam has a similar effect to the strip-shaped beam to detect the number of raindrops.

What is claimed is:

1. A raindrop sensor comprising:

a light emitting device for emitting light in a strip-shaped beam;

a light receiver for receiving the strip-shaped beam;

a processor for detecting raindrops based on the light received from said receiver; and a processor for providing a signal representing a rain condition based on the output of the raindrop detector;

wherein said raindrop sensor is mounted on a vehicle, and said strip-shaped light is inclined low in a front portion thereof with respect to a moving direction of said vehicle.

2. A raindrop sensor as claimed in claim 1, further comprising adjusting means for adjusting an inclination angle of said strip-shaped light.

\* \* \* \* \*